United States Patent
Iyasu et al.

(10) Patent No.: US 10,763,669 B2
(45) Date of Patent: Sep. 1, 2020

(54) POWER CONVERSION SYSTEM CONTROL DEVICE

(71) Applicant: DENSO CORPORATION, Kariya, Aichi-pref. (JP)

(72) Inventors: Seiji Iyasu, Nisshin (JP); Yuji Hayashi, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/523,100

(22) Filed: Jul. 26, 2019

(65) Prior Publication Data

US 2019/0348837 A1 Nov. 14, 2019

Related U.S. Application Data

(63) Continuation of application No. PCT/JP2018/002256, filed on Jan. 25, 2018.

(30) Foreign Application Priority Data

Jan. 31, 2017 (JP) .................. 2017-016076

(51) Int. Cl.
*H02J 1/10* (2006.01)
*G05F 1/565* (2006.01)
(Continued)

(52) U.S. Cl.
CPC .............. *H02J 1/102* (2013.01); *G05F 1/565* (2013.01); *H02M 1/32* (2013.01); *H02M 3/33507* (2013.01); *H02J 1/106* (2020.01)

(58) Field of Classification Search
CPC .......... H02M 1/32; H02M 3/28; H02M 3/285; H02M 3/335; H02M 3/33507;
(Continued)

(56) References Cited

U.S. PATENT DOCUMENTS 6,018,204 A * 1/2000 Kuruma .................... G06F 1/28
307/64
9,496,701 B2 * 11/2016 Zheng .................... H02H 3/046
(Continued)

FOREIGN PATENT DOCUMENTS

JP H08-88971 A 4/1996
JP 5202268 B2 6/2013

OTHER PUBLICATIONS

Feb. 20, 2018 International Search Report issued in International Patent Application No. PCT/JP2018/002256.

*Primary Examiner* — Matthew V Nguyen
(74) *Attorney, Agent, or Firm* — Oliff PLC

(57) ABSTRACT

A control device is applied to a power conversion system including a first DDC and a second DDC connected in parallel with a common power supply target. The control device performs the equalization control of correcting, with an output correction voltage, at least any of a voltage command value of the first DDC and a voltage command value of the second DDC to equalize an output current. Moreover, while the equalization control is being performed, it is determined on which one of an output side of the first DDC or an output side of the second DDC abnormal disconnection has been caused based on the output correction voltage.

7 Claims, 11 Drawing Sheets

(51) Int. Cl.
*H02M 1/32* (2007.01)
*H02M 3/335* (2006.01)

(58) Field of Classification Search
CPC ..... H02M 3/33592; H02M 2001/0025; H02M 2001/0032; H02M 2001/0048; H02J 1/10; H02J 1/102; H02J 1/106; H02J 1/12; H02J 1/14; G05F 1/56; G05F 1/565
See application file for complete search history.

(56) References Cited

U.S. PATENT DOCUMENTS

2015/0102672 A1* 4/2015 Matsumoto ............. H02M 1/08
 307/31
2017/0036550 A1* 2/2017 Oba ........................ B60L 11/08

\* cited by examiner

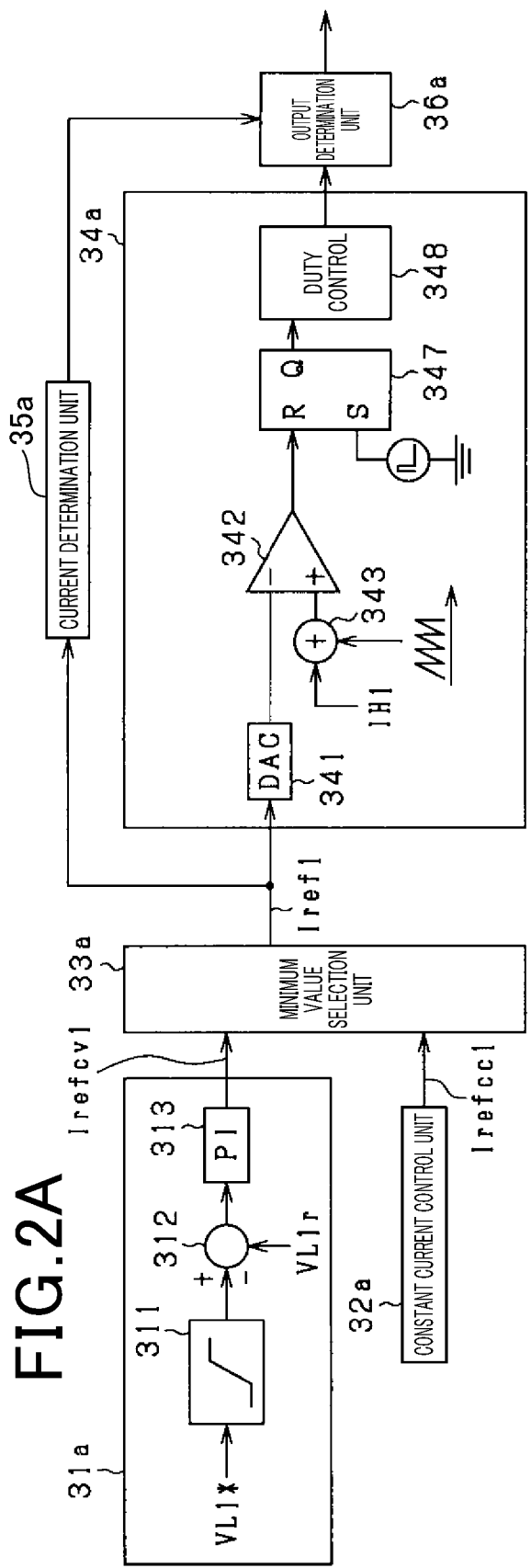
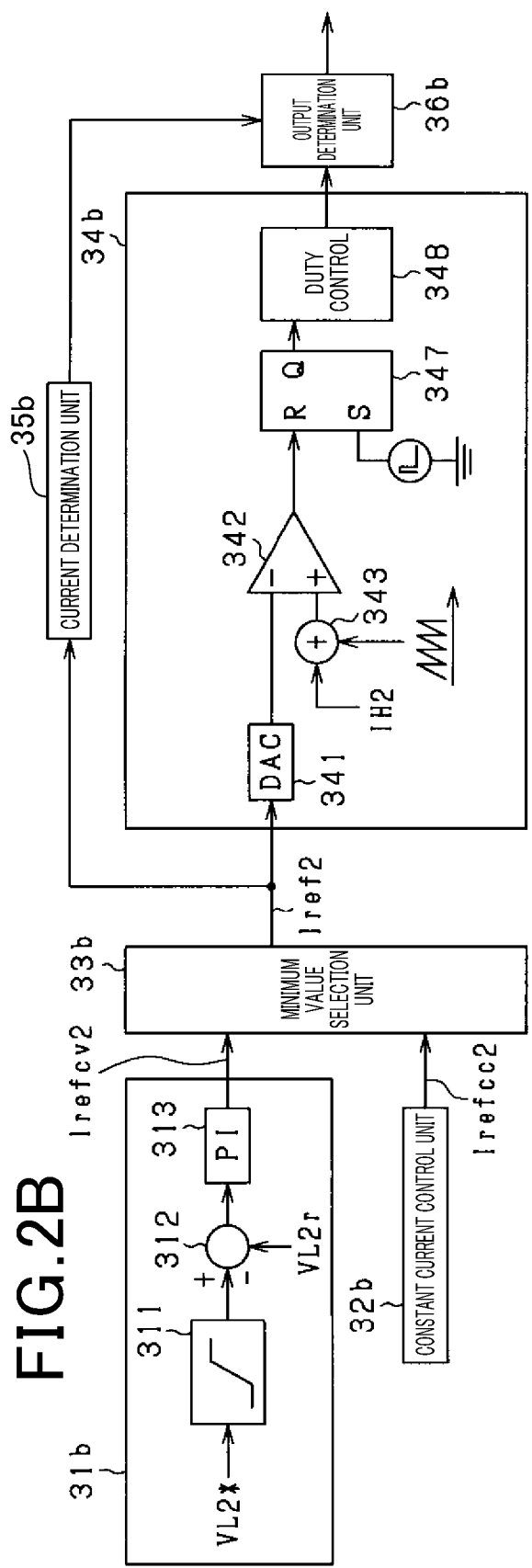

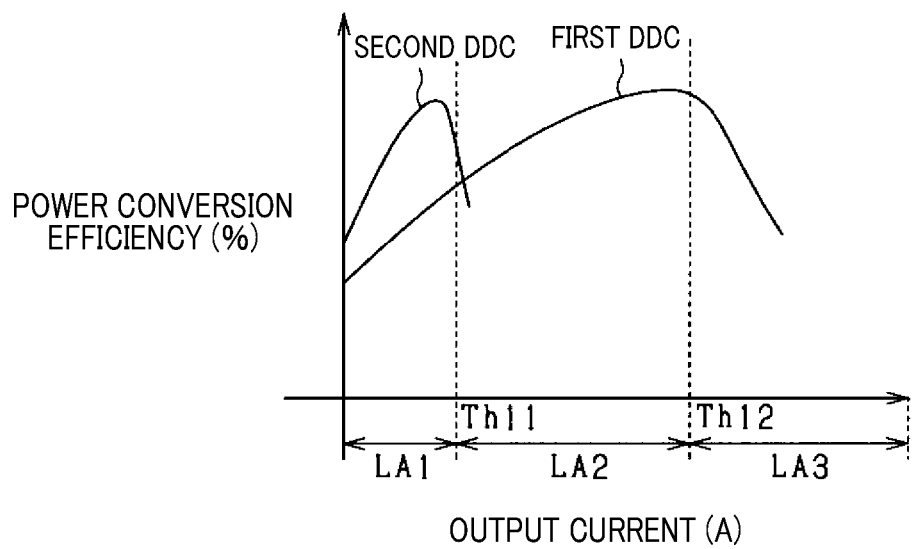
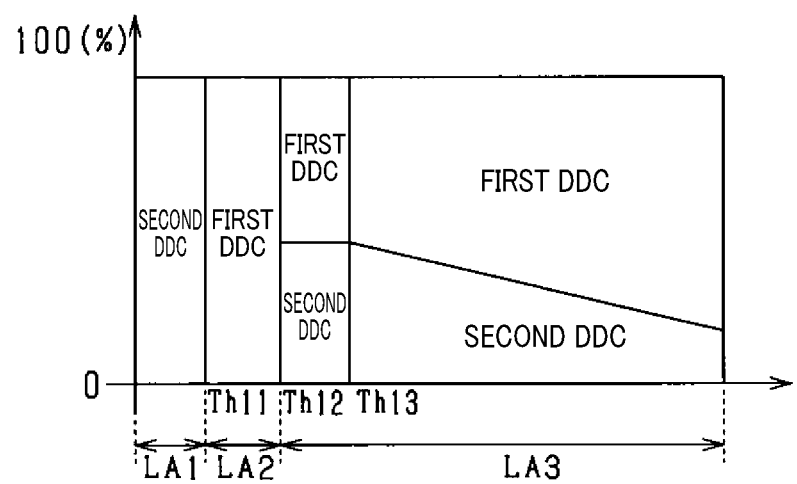

INDEPENDENT OPERATION OF SECOND DDC

INDEPENDENT OPERATION OF FIRST DDC

US 10,763,669 B2

POWER CONVERSION SYSTEM CONTROL DEVICE

CROSS-REFERENCE TO RELATED APPLICATION

This application is a U.S. application under 35 U.S.C. 111(a) and 363 that claims the benefit under 35 U.S.C. 120 from International Application No. PCT/JP2018/002256 filed on Jan. 25, 2018, the entire contents of which are incorporated herein by reference. This application is also based on and claims the benefit of priority from Japanese Patent Application No. 2017-016076 on filed Jan. 31, 2017, the entire contents of which are incorporated herein by reference.

BACKGROUND

Technical Field

The present disclosure relates to a power conversion system control device.

Background Art

Typically, a power conversion system including multiple power conversion devices connected in parallel with a common power supply target and configured to supply power to the power supply target has been known. The power conversion system includes one configured to equalize the output current of each power conversion device to output the resultant current to the power supply target.

SUMMARY

The present disclosure is applied to a power conversion system including a first power conversion device and a second power conversion device connected in parallel with a common power supply target, and includes an equalization control unit configured to perform equalization control and an abnormal disconnection determination unit configured to determine, based on an output correction voltage, on which one of an output side of the first power conversion device or an output side of the second power conversion device abnormal disconnection has been caused while the equalization control is being performed.

BRIEF DESCRIPTION OF THE DRAWINGS

The above-described object of the present disclosure and other objects, features, and advantageous effects of the present disclosure will be more apparent from the following detailed description with reference to the attached drawings. The drawings are:

FIG. 2A and 2B are functional block diagrams for describing functions of a control unit;

FIG. 3 describes a relationship between output currents and power conversion efficiencies of first and second DDCs;

FIG. 4 describes operation of the first and second DDCs according to a load;

DETAILED DESCRIPTION OF THE PREFERRED EMBODIMENTS

Figure 1:
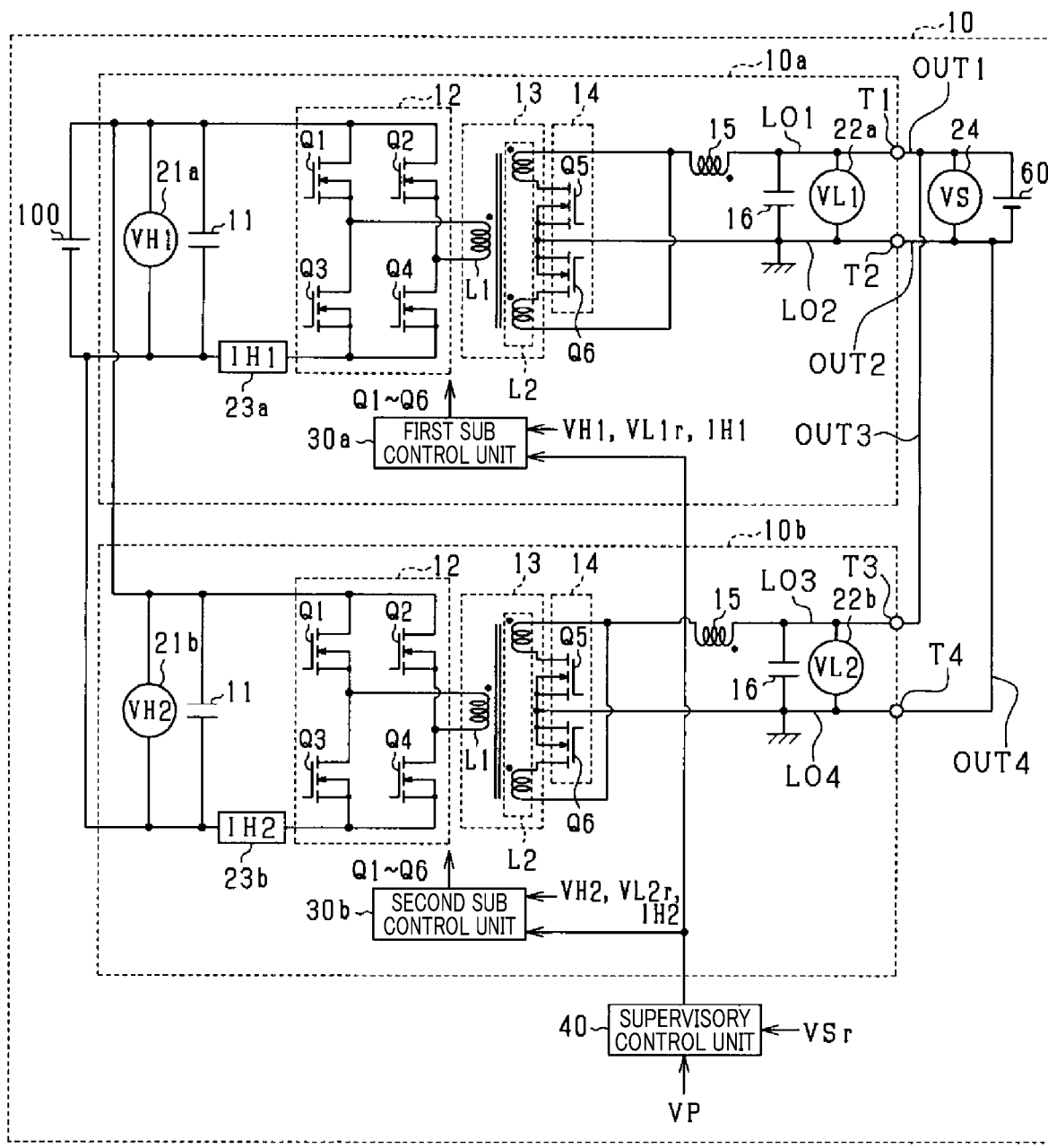
FIG. 1 is a configuration diagram of a power conversion system.

The inventor of the present disclosure has studied a power conversion system control device configured so that in a configuration in which two power conversion devices are connected in parallel with a common power supply target, abnormal disconnection on an output side of each power conversion device can be detected.

In a case where two power conversion devices are connected in parallel with the common power supply target, even if abnormal disconnection is caused on an output side of any of the power conversion devices, output voltage is supplied from the power conversion device with no abnormal disconnection to the power supply target. Thus, in the technique of detecting a voltage value on the output side, it might be, in some cases, difficult to determine at which one of the power conversion devices the abnormal disconnection has been caused. Moreover, in the technique of detecting the voltage value on the output side of the power conversion device, a resistance value on the output side needs to be increased to increase a difference in the detected voltage between a case with the abnormal disconnection and a case without the abnormal disconnection. However, when the resistance value on the output side is increased, energy to be consumed on the output side is increased by a resistance value increment, and a problem is caused in terms of an efficiency. Moreover, when the resistance value on the output side is increased, a problem that heat generation on the output side easily occurs is caused.

The present disclosure has been made in view of the above-described problems, and the object of the present disclosure is to provide a power conversion system control device configured so that in a configuration in which two power conversion devices are connected in parallel with a common power supply target, abnormal disconnection on an output side of each power conversion device can be detected.

For solving the above-described problems, the present disclosure is applied to a power conversion system including a first power conversion device and a second power conversion device connected in parallel with a common power supply target, and includes an equalization control unit configured to perform the equalization control of correcting, with an output correction voltage, at least any of a voltage command value of the first power conversion device and a voltage command value of the second power conversion device to equalize an output current and an abnormal disconnection determination unit configured to determine, based on the output correction voltage, on which one of an output side of the first power conversion device or an output side of the second power conversion device abnormal disconnection has been caused while the equalization control is being performed.

There is a system configured to perform the equalization control of correcting, with the output correction voltage, at least any of the voltage command values to equalize the output current of the first power conversion device and the output current of the second power conversion device. In the power conversion system having such a configuration, the present disclosing party has found that there is a correlation between the magnitudes of resistance values on the output sides of the first power conversion device and the second power conversion device and the output correction voltage for correcting the voltage command value. Specifically, it has been found that the output correction voltage changes according to a change in the output current, taking a difference between the resistance values on the output sides of the first power conversion device and the second power conversion device as a gradient value.

In a case where the abnormal disconnection has been caused on the output side of any of the first power conversion device and the second power conversion device, the resistance value on the output side with the abnormal disconnection increases, and the above-described gradient value changes accordingly. Such a change in the gradient value can be detected as a change in the output correction voltage. Thus, in the above-described configuration, while the equalization control is being performed, it is, based on the output correction voltage, determined on which one of the output side of the first power conversion device or the output side of the second power conversion device the abnormal disconnection has been caused. Thus, it can be properly determined on which one of the output sides of the power conversion devices the abnormal disconnection has been caused.

First Embodiment

FIG. 1 is a configuration diagram of a power conversion system 10 according to a first embodiment. The power conversion system 10 includes a first DC/DC converter (hereinafter referred to as a "first DDC 10a") and a second DC/DC converter (hereinafter referred to as a "second DDC 10b"), output sides of these converters being connected in parallel with a first storage battery 60 as a common power supply target. Moreover, input sides of the first DDC 10a and the second DDC 10b are connected in parallel with a second storage battery 100 as a common DC power source. In the present embodiment, the first DDC 10a is equivalent to a first power conversion device, and the second DDC 10b is equivalent to a second power conversion device.

A first terminal T1 of the first DDC 10a is connected to a plus-side terminal of the first storage battery 60 through a first output side line OUT1. A second terminal T2 of the first DDC 10a is connected to a minus-side terminal of the first storage battery 60 through a second output side line OUT2. A third terminal T3 of the second DDC 10b is connected to the plus-side terminal of the first storage battery 60 through a third output side line OUT3 and the first output side line OUT1. A fourth terminal T4 of the second DDC 10b is connected to the minus-side terminal of the first storage battery 60 through a fourth output side line OUT4 and the second output side line OUT2.

In the present embodiment, the output voltage of the second storage battery 100 is set higher than the output voltage of the first storage battery 60. The first DDC 10a and the second DDC 10b drop DC voltage supplied from the second storage battery 100 to generate output voltage. In the present embodiment, the first storage battery 60 includes a lead storage battery. Moreover, the second storage battery 100 includes a lithium-ion storage battery. Note that various devices to be driven with DC power supplied from the power conversion system 10 may be connected in parallel with the first storage battery 60.

Next, a configuration of the first DDC 10a will be described in detail. The first DDC 10a is a full-bridge DC/DC converter, and includes a smoothing capacitor 11, a first conversion circuit 12, a transformer 13, a second conversion circuit 14, a reactor 15, and a filter capacitor 16.

The smoothing capacitor 11 is connected in parallel between a plus-side terminal and a minus-side terminal of the second storage battery 100.

The first conversion circuit 12 includes first to fourth switches Q1 to Q4, and ON/OFF of each of the switches Q1 to Q4 is switched such that DC power from the second storage battery 100 is converted into AC power and the AC power is supplied to a primary-side coil L1 of the transformer 13. The first conversion circuit 12 includes a first leg connecting a source of the first switch Q1 and a drain of the third switch Q3 in series, and a second leg connecting a source of the second switch Q2 and a drain of the fourth switch Q4 in series. The first leg and the second leg are connected in parallel with the second storage battery 100. Moreover, a connection point between the first switch Q1 and the third switch Q3 is connected to a first end of the primary-side coil L1 of the transformer 13, and a connection point between the second switch Q2 and the fourth switch Q4 is connected to a second end of the primary-side coil L1. In the present embodiment, each of the switches Q1 to Q4 includes a MOS-FET.

The transformer 13 includes a secondary-side coil L2 in addition to the primary-side coil L1. The second conversion circuit 14 is connected to the secondary-side coil L2. AC voltage is supplied from the first conversion circuit 12 to the primary-side coil L1, and accordingly, AC voltage corresponding to a turn ratio between the primary-side coil L1 and the secondary-side coil L2 is generated at the secondary-side coil L2.

The second conversion circuit 14 includes a fifth switch Q5 and a sixth switch Q6. The second conversion circuit 14 converts AC voltage generated at the secondary-side coil L2 of the transformer 13 into DC voltage. Moreover, a drain of the fifth switch Q5 and a drain of the sixth switch Q6 are each connected to both ends of the secondary-side coil L2. Further, a source of the fifth switch Q5 and a source of the sixth switch Q6 are connected to each other. In the present embodiment, each of the switches Q5, Q6 includes a MOSFET.

A first end of the reactor 15 is connected to one end of the secondary-side coil L2, and the DC voltage converted by the second conversion circuit 14 is supplied to the reactor 15. The first terminal T1 is connected to a second end of the reactor 15 through a first electric path LO1. The second terminal T2 is connected to a connection point between the fifth switch Q5 and the sixth switch Q6 through a second electric path LO2. The filter capacitor 16 is connected to between the first electric path LO1 and the second electric path LO2. Thus, the filter capacitor 16 is connected in parallel with the first storage battery 60.

The first DDC 10a includes a first sub control unit 30a. The first sub control unit 30a turns on/off each of the switches Q1 to Q6 forming the first conversion circuit 12 and the second conversion circuit 14 in the first DDC 10a. Note that the first sub control unit 30a may include an integrated circuit including multiple functional blocks, for example. Each function of the first sub control unit 30a will be described later.

The first DDC 10a includes a first input voltage sensor 21a, a first output voltage sensor 22a, and a first current sensor 23a. The first input voltage sensor 21a is connected to between the second storage battery 100 and the smoothing capacitor 11, and detects, as a first input voltage VH1, voltage input from the second storage battery 100 to the first DDC 10a. The first output voltage sensor 22a is connected to between the filter capacitor 16 and the first storage battery 60, and detects the output voltage of the first DDC 10a as a first output voltage VL1r. The first current sensor 23a detects, as a first current IH1, current flowing in an electric path connecting the smoothing capacitor 11 and the first conversion circuit 12. Each of the detection values VH1, VL1r, IH1 detected by the first input voltage sensor 21a, the first output voltage sensor 22a, and the first current sensor 23a is input to the first sub control unit 30a.

Subsequently, a configuration of the second DDC 10b will be described. Note that in the present embodiment, the first and second DDCs 10a, 10b have the same basic configuration, and description of the second DDC 10b will be omitted as necessary. Moreover, reference signs common to the components of the first DDC 10a are used to represent components of the second DDC 10b.

In the second DDC 10b, the third terminal T3 is connected to the second end of the reactor 15 through a third electric path LO3. In the second DDC 10b, the fourth terminal T4 is connected to the connection point between the fifth switch Q5 and the sixth switch Q6 through a fourth electric path LO4. In the second DDC 10b, the filter capacitor 16 is connected to between the third electric path LO3 and the fourth electric path LO4.

The second DDC 10b includes a second sub control unit 30b, a second input voltage sensor 21b, a second output voltage sensor 22b, and a second current sensor 23b. The second input voltage sensor 21b detects, as a second input voltage VH2, voltage input from the second storage battery 100 to the second DDC 10b. The second output voltage sensor 22b detects the output voltage of the second DDC 10b as a second output voltage VL2r. The second current sensor 23b detects, as a second current IH2, current flowing in an electric path connecting a smoothing capacitor 11 and a first conversion circuit 12 in the second DDC 10b. Each of the detection values VH2, VL2r, IH2 detected by the second input voltage sensor 21b, the second output voltage sensor 22b, and the second current sensor 23b is input to the second sub control unit 30b.

The power conversion system 10 includes a supervisory control unit 40. The supervisory control unit 40 includes a well-known microcomputer, and is electrically connected to each of the sub control units 30a, 30b. A battery voltage detection unit 24 configured to detect the inter-terminal voltage of the first storage battery 60 is provided between each of the terminals T1, T2 of the first DDC 10a and the first storage battery 60. The battery voltage detection unit 24 is connected in parallel with the first storage battery 60 by the first output side line OUT1 and the second output side line OUT2, thereby detecting the inter-terminal voltage VSr of the first storage battery 60. The inter-terminal voltage VSr detected by the battery voltage detection unit 24 is output to the supervisory control unit 40.

Next, functions of each of the sub control units 30a, 30b will be described. FIG. 2A illustrates the first sub control unit 30a, and FIG. 2B illustrates the second sub control unit 30b. The first sub control unit 30a and the second sub control unit 30b basically have the same configuration. Thus, only functional blocks of the first sub control unit 30a will be described in detail below, and description of functional blocks of the second sub control unit 30b will be omitted as necessary. Moreover, the first and second currents IH1, IH2 used in each of the sub control units 30a, 30b and the supervisory control unit 40 will be hereinafter taken as values obtained in such a manner that the first and second currents IH1, IH2 detected by the first and second current sensors 23a, 23b are converted according to the turn ratio between the primary-side coil L1 and the secondary-side coil L2. The above-described converted values are equivalent to the output currents of the first and second DDCs 10a, 10b.

As illustrated in FIG. 2A, the first sub control unit 30a includes a constant voltage control unit 31a, a constant current control unit 32a, a minimum value selection unit 33a, and a peak current control unit 34a.

The constant voltage control unit 31a calculates, as an operation amount for the control of feeding back the first output voltage VL1r to a first voltage command value VL1*, a first target current value Irefcv1 as a target value of the output current of the first DDC 10a. In the present embodiment, the first voltage command value VL1* is output from the supervisory control unit 40 to the first sub control unit 30a. Moreover, a second voltage command value VL2* is output from the supervisory control unit 40 to the second sub control unit 30b.

The constant voltage control unit 31a includes a slow changer 311, a voltage deviation calculator 312, and a PI controller 313. First, the first voltage command value VL1* is input to the slow changer 311. The slow changer 311 outputs a value obtained in such a manner that the first voltage command value VL1* is gradually changed according to a change in the first voltage command value VL1*. The voltage deviation calculator 312 subtracts the first output voltage VL1r detected by the first output voltage sensor 22a from the first voltage command value VL1* converted by the slow changer 311, thereby calculating a deviation. The deviation calculated by the voltage deviation calculator 312 is input to the PI controller 313. The PI controller 313 performs proportional-integral control for the input deviation, thereby calculating the first target current value Irefcv1.

The constant current control unit 32a calculates a first upper current value Irefcc1. In the present embodiment, the first upper current limit value Irefcc1 is set to the rated current (e.g., 120 A) of the first DDC 10a.

The minimum value selection unit 33a compares the first target current value Irefcv1 output from the constant voltage control unit 31a and the first upper current value Irefcc1 output from the constant current control unit 32a, thereby selecting and outputting a smaller one of these values. Thus, in a case where the first target current value Irefcv1 exceeds the first upper current limit value Irefcc1, the minimum value selection unit 33a outputs the first upper current limit value Irefcc1 to the peak current control unit 34a. Of Irefcv1 and Irefcc1, the current value selected by the minimum value selection unit 33a will be hereinafter described as a first current command value Iref1.

The peak current control unit 34a includes a DA converter 341, a comparator 342, and an adder 343. First, the first current command value Iref1 selected by the minimum value selection unit 33a is input to the DA converter 341. The DA converter 341 converts the input first current command value Iref1 from a digital value into an analog value. The first current command value Iref1 converted into the analog value is input to an inverted input terminal of the comparator 342. The adder 343 adds the first current IH1 and a slope compensation signal, thereby outputting the resultant value as a compensated switch current. An output signal of the adder 343 is input to a non-inverted input terminal of the comparator 342. Note that the slope compensation signal is for reducing oscillation accompanied by fluctuation in current flowing in the reactor 15.

The comparator 342 compares the first current command value Iref1 and the compensated switch current, thereby inputting a signal in a low state to a R-terminal of a RS flip-flop 347 during a period in which the compensated switch current is lower than the first current command value Iref1. Moreover, the comparator 342 inputs a signal in a high state to the R-terminal of the RS flip-flop 347 during a period in which the compensated switch current is higher than the first current command value Iref1. Further, a clock signal is input to a S-terminal of the RS flip-flop 347. After an upper duty limit has been set by a duty control unit 348, the output of the RS flip-flop 347 is output as drive signals G1, G2, G3, G4 for turning on/off the first, second, third, and fourth switches Q1, Q2, Q3, Q4.

The first sub control unit 30a includes a current determination unit 35a and an output determination unit 36a. The current determination unit 35a and the output determination unit 36a output, as the drive signals G1 to G4, OFF drive signals for turning off the first to fourth switches Q1 to Q4 in a case where the first current command value Iref1 selected by the minimum value selection unit 33a falls below such a current value that the first DDC 10a can be stably operated. Thus, in a case where the first current command value Iref1 is too small to stably operate the first to fourth switches Q1 to Q4, the first to fourth switches Q1 to Q4 are turned off, and operation of the first DDC 10a is stopped.

Specifically, the current determination unit 35a determines whether the first current command value Iref1 output from the minimum value selection unit 33a is equal to or smaller than a predetermined current value or not. In a case where the output determination unit 36a acquires, from the current determination unit 35a, a determination result showing that the first current command value Iref1 exceeds the predetermined current value, the output determination unit 36a directly outputs each of the drive signals G1 to G4 output from the duty control unit 348 to gates of the first to fourth switches Q1 to Q4. On the other hand, in a case where the output determination unit 36a acquires, from the current determination unit 35a, a determination result showing that the first current command value Iref1 is equal to or smaller than the predetermined current value, the output determination unit 36a switches all of the drive signals G1 to G4 output from the duty control unit 348 to the OFF drive signals, and outputs the OFF drive signals. Thus, operation of the first DDC 10a is stopped.

Note that as illustrated in FIG. 2B, the second sub control unit 30b includes, as in the first sub control unit 30a, a constant voltage control unit 31b, a constant current control unit 32b, a minimum value selection unit 33b, a peak current control unit 34b, a current determination unit 35b, and an output determination unit 36b. The function of each of the units 31b to 36b is the same as the function of each of the units 31a to 36a in the first DDC 10a, but input and output signals vary. That is, the constant voltage control unit 31b calculates, as an operation amount for the control of feeding back the second output voltage VL2r to the second voltage command value VL2*, a second target current value Irefcv2 as a target value of the output current. Moreover, the constant current control unit 32b calculates a second upper current limit value Irefcc2. In the present embodiment, the second upper current limit value Irefcc2 is set to the rated current (e.g., 30 A) of the second DDC 10b. The minimum value selection unit 33b compares the second target current value Irefcv2 and the second upper current limit value Irefcc2, thereby selecting and outputting a smaller one of these values. Of Irefcv2 and Irefcc2, the current value selected by the minimum value selection unit 33a will be hereinafter described as a second current command value Iref2. The current determination unit 35b and the output determination unit 36b output, as drive signals G1 to G4, OFF drive signals for turning off first to fourth switches Q1 to Q4 of the second DDC 10b in a case where the second current command value Iref2 falls below such a current value that the second DDC 10b can be stably operated.

Next, power conversion efficiencies of the first DDC 10a and the second DDC 10b will be described. FIG. 3 shows the power conversion efficiency [%] in association with the output current of each of the first DDC 10a and the second DDC 10b. Note that in the present embodiment, a power conversion efficiency of the power conversion system 10 is defined by Expression (1) below.

$$\eta = Pout/Pin \times 100 \quad (1)$$

In Expression (1) above, η represents the power conversion efficiency, and is a value of 0 [%] to 100 [%]. Pout represents the output power of each of the DDCs 10a, 10b, and Pin represents the input power of each of the DDCs 10a, 10b.

The first DDC 10a is different from the second DDC 10b in a load with the maximum power conversion efficiency. As illustrated in FIG. 3, the second DDC 10b is designed such that the power conversion efficiency in a first load area LA1 is maximum, and the first DDC 10a is designed such that the power conversion efficiency in a second load area LA2 with a greater load than that of the first load area LA1 is maximum. Moreover, the power conversion efficiency of the second DDC 10b is higher than the power conversion efficiency of the first DDC 10a across the entirety of the first load area LA1. Further, the power conversion efficiency of the first DDC 10a is higher than the power conversion efficiency of the second DDC 10b across the entirety of the second load area LA2.

In the present embodiment, the rated current of the second DDC 10b has a smaller value than the ranted current of the first DDC 10a. The first load area LA1 is set to a range of equal to or greater than zero and equal to or smaller than a first current threshold Th11, and the first current threshold Th11 is set to the rated current of the second DDC 10b. Moreover, the second load area LA2 is set to a range of greater than the first current threshold Th11 and equal to or smaller than a second current threshold Th12, and the second current threshold Th12 is set to a value smaller than the rated current of the first DDC 10a. Further, a third load area LA3 is set to a range of greater than the second current threshold Th12.

A third current threshold Th13 is set for the third load area LA3. The third current threshold Th13 is set to a value (e.g., 60 A) of greater than the second current threshold Th12, the value being obtained by doubling of the rated current of the second DDC 10b.

As illustrated in FIG. 4, the supervisory control unit 40 switches operation of the first DDC 10a and the second DDC 10b according to the load. Specifically, in the first load area LA1, the second DDC 10b is operated independently. In the second load area LA2, the first DDC 10a is operated independently. Moreover, in the third load area LA3, the first DDC 10a and the second DDC 10b are operated. Further, in the third load area LA3, in a case where the load is greater than the second current threshold Th12 and smaller than the third current threshold Th13, the equalization control of equalizing the output currents of the first DDC 10a and the second DDC 10b is performed. By the equalization control, the first DDC 10a and the second DDC 10b are controlled such that the output currents of the first DDC 10a and the second DDC 10b become the same.

Abnormal disconnection might be caused on the output side of the first DDC 10a or the second DDC 10b. In the present embodiment, the abnormal disconnection on the output side of the first DDC 10a includes disconnection in the middle of at least one of the first electric path LO1, the second electric path LO2, a first-terminal-T1-side line with respect to a connection point of the first output side line OUT1 with the third output side line OUT3, or a second-terminal-T2-side line with respect to a connection point of the second output side line OUT2 with the fourth output side line OUT4. Moreover, the abnormal disconnection on the output side of the first DDC 10a includes at least one of detachment of the first output side line OUT1 from the first terminal T1 or detachment of the second output side line OUT2 from the second terminal T2. Further, in the present embodiment, the abnormal disconnection on the output side of the second DDC 10b includes disconnection in the middle of at least one of the third electric path LO3, the fourth electric path LO4, the third output side line OUT3, or the fourth output side line OUT4. In addition, the abnormal disconnection on the output side of the second DDC 10b includes at least one of detachment of the third output side line OUT3 from the third terminal T3 or detachment of the fourth output side line OUT4 from the fourth terminal T4.

In the configuration in which two DDCs 10a, 10b are connected in parallel with the first storage battery 60 as the common power supply target, even when the abnormal disconnection is, for example, caused on the output side of the first DDC 10a, the output voltage is supplied to the first storage battery 60 from the output side of the second DDC 10b without the abnormal disconnection. Thus, in the method for determining the abnormal disconnection by means of the output voltage VL1r, VL2r detected by each of the output voltage sensors 22a, 22b, it might be difficult to determine in which one of the DDCs 10a, 10b the abnormal disconnection has been caused. For this reason, in the present embodiment, the supervisory control unit 40 is configured to determine, by an output correction voltage VLB used for the equalization control, in which one of the DDCs 10a, 10b the abnormal disconnection has been caused.

Figure 5:
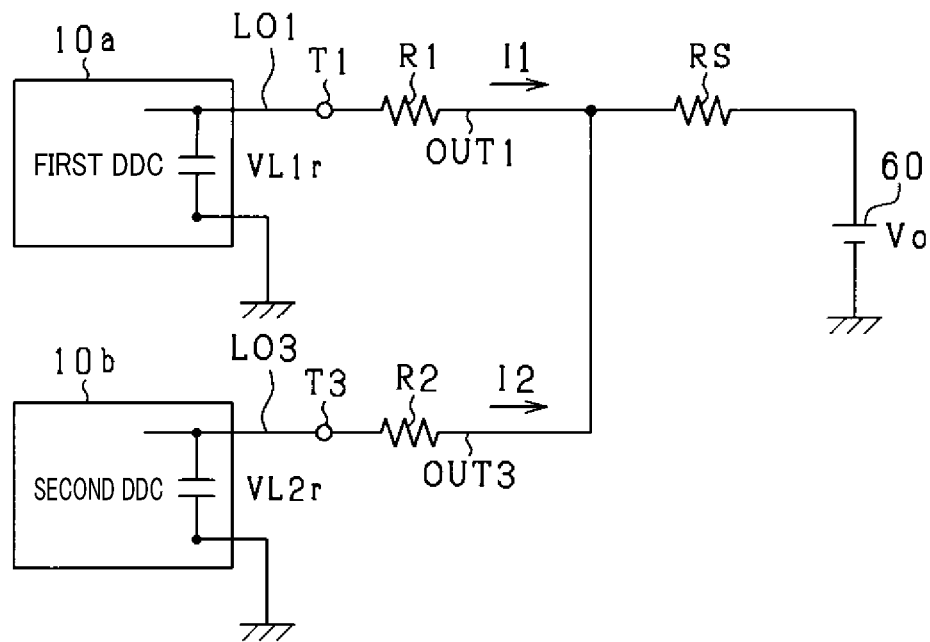
FIG. 5 is a diagram for describing the principle of determining abnormal disconnection by a change in a correction voltage.

FIG. 5 is a circuit diagram illustrating each unit of the power conversion system 10 in a simple manner. In FIG. 5, the inter-terminal voltage of the first storage battery 60 is illustrated as Vo, the output voltage of the first DDC 10 is illustrated as VL1r, and the output voltage of the second DDC is illustrated as VL2r. Moreover, the combined resistance of the first electric path LO1 and the first-terminal-T1-side line with respect to the connection point of the first output side line OUT1 with the third output side line OUT3 is illustrated as a first resistance value R1. Moreover, the combined resistance of the third electric path LO3 and the third output side line OUT3 is illustrated as a second resistance value R2. Note that in FIG. 5, RS indicates the resistance value of a line on a first storage battery 60 side with respect to the connection point of the first output side line OUT1 with the third output side line OUT3. Note that in the present embodiment, RS is an extremely smaller value as compared to R1, R2, and RS≈0 is satisfied.

Current flows in each of the output side lines OUT1, OUT3 connecting each of the DDCs 10a, 10b and the first storage battery 60, and accordingly, a voltage drop occurs. Thus, the inter-terminal voltage Vo and the output voltages VL1r, VL2r are in a relationship described in Expressions (2) and (3) below.

$$VL1r = I1 \times R1 + Vo \quad (2)$$

$$VL2r = I2 \times R2 + Vo \quad (3)$$

In these expressions, I1 indicates a current flowing in the first output side line OUT1, and I2 indicates a current flowing in the third output side line OUT3.

In a case where the supervisory control unit 40 corrects the output voltages VL1r, VL2r with the output correction voltage VLB such that the output currents of the first DDC 10a and the second DDC 10b are equalized with I3, Expressions (4) and (5) below are derived from Expressions (2) and (3) above.

$$VL1r + VLB = I3 \times R1 + Vo \quad (4)$$

$$VL2r + VLB = I3 \times R2 + Vo \quad (5)$$

Expression (6) below is derived from Expressions (4) and (5) above.

$$VLB = (R1 - R2)/2 \times I3 - (VL1r - VL2r)/2 \quad (6)$$

Expression (7) below is derived from Expression (6) above.

$$VLB = (R1 - R2)/2 \times I3 + \Delta \text{off} \quad (7)$$

Expression (7) above shows that the output correction voltage VLB changes according to a current amount I3 after equalization, a difference between the resistance values R1, R2 being taken as a gradient amount. Note that a difference between the first output voltage VL1r and the second output voltage VL2r while the equalization control is being performed is illustrated as a detection variation Δoff.

Figure 6:
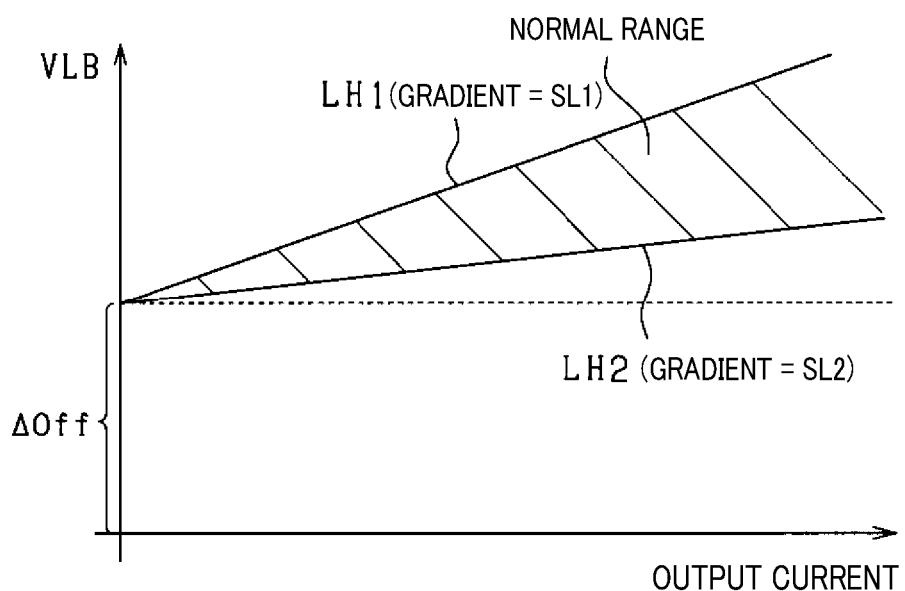
FIG. 6 describes a change in the correction voltage VLB, the horizontal axis indicating an output current and the vertical axis indicating an output correction voltage VLB.

FIG. 6 describes a change in the output correction voltage VLB based on Expression (7) above in a case where the horizontal axis indicates the total of the output currents of the DDCs 10a, 10b and the vertical axis indicates the output correction voltage VLB.

In a case where no abnormal disconnection is caused at each of the DDCs 10a, 10b, a difference between the first resistance value R1 of the first output side line OUT1 and the second resistance value R2 of the third output side line OUT3 is within a predetermined range. Thus, in FIG. 6, a change in the output correction voltage VLB in a case where no abnormal disconnection is caused at each of the DDCs 10a, 10b is defined as a normal range. This normal range is a range defined by an upper limit value LH1 and a lower limit value LH2. Thus, the upper limit value LH1 and the lower limit value LH2 increase as the output current increases.

In FIG. 6, change in the upper limit value LH1 in association with a change in the output current is illustrated as a first gradient threshold SL1, and change in the lower limit value LH2 in association with a change in the output current is illustrated as a second gradient threshold SL2. The upper limit value LH1 has a greater gradient than that of the lower limit value LH2, and therefore, the first gradient threshold SL1 is a greater value than the second gradient threshold SL2.

On the other hand, in a case where the abnormal disconnection has been caused at any of the first DDC 10a and the second DDC 10b, a resistance value corresponding to one of the resistance values R1, R2 with the abnormal disconnection increases, and the gradient value (R1−R2)/2 in Expression (7) above changes. Specifically, in a case where the abnormal disconnection has been caused at the first DDC 10a, the first resistance value R1 becomes greater than the second resistance value R2, and therefore, the gradient value (R1−R2)/2 changes to a positive side. Thus, in FIG. 6, the output correction voltage VLB becomes a greater value than the normal range. In a case where the abnormal disconnection has been caused at the second DDC 10b, the second resistance value R2 becomes greater than the first resistance value R1, and therefore, the gradient value (R1−R2)/2 changes to a negative side. Thus, in FIG. 6, the output correction voltage VLB becomes a smaller value than the normal range.

Using characteristics illustrated in FIGS. 5 and 6, it can be, from the output correction voltage VLB used for the equalization control, determined whether the abnormal disconnection at the first DDC 10a or the second DDC 10b has been caused. In the present embodiment, the gradient value of the output correction voltage VLB with respect to the output current is calculated, and from this gradient value, the abnormal disconnection at the first DDC 10a or the second DDC 10b is determined.

Figure 7:
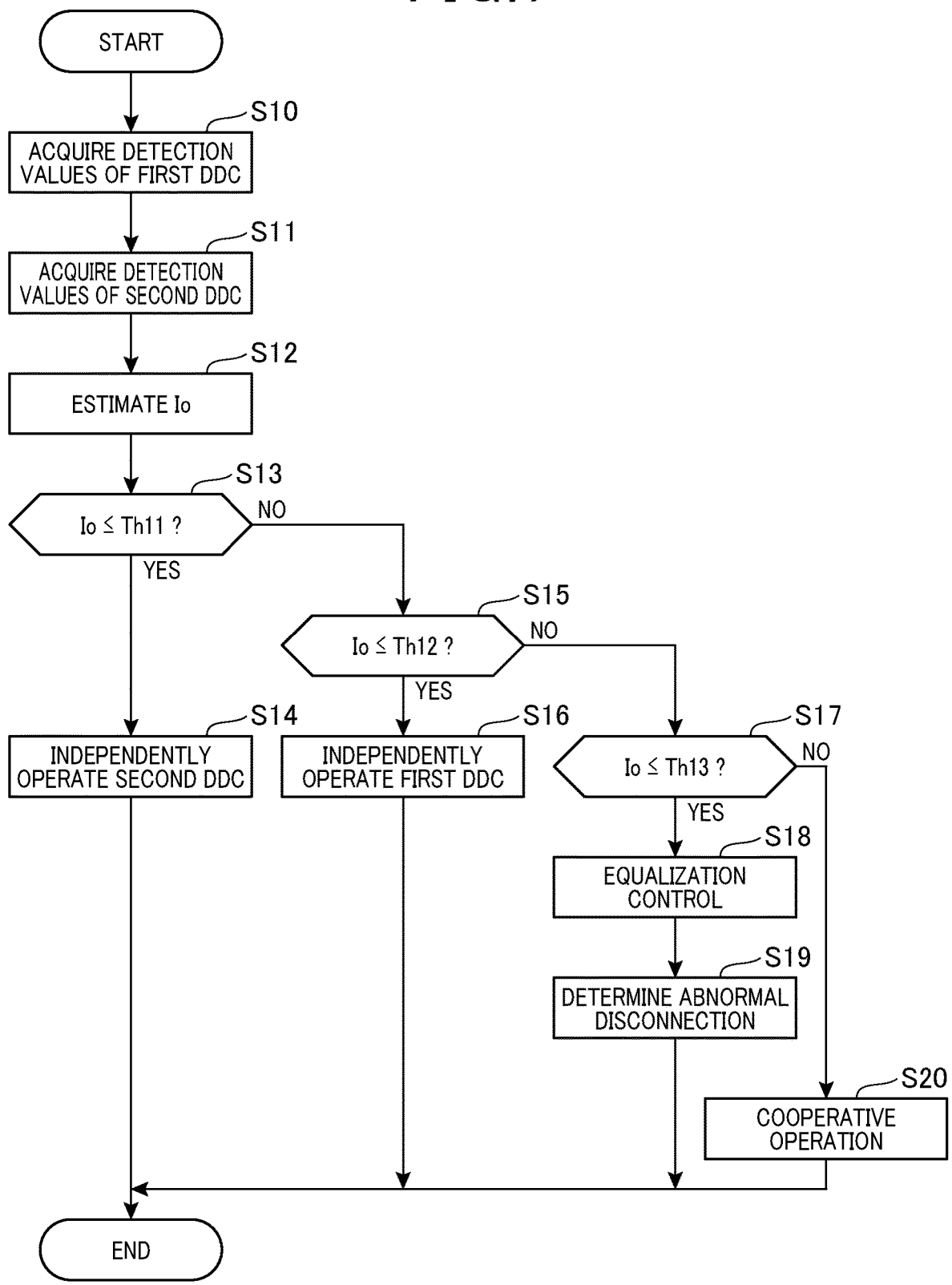
FIG. 7 is a flowchart for describing the processing of switching each type of operation by a supervisory control unit.

Next, the processing of switching operation of the first DDC 10a and the second DDC 10b by the supervisory control unit 40 and abnormal disconnection detection processing will be described. FIG. 7 is a flowchart for describing the processing of switching operation of each of the DDCs 10a, 10b by the supervisory control unit 40 and the abnormal disconnection detection processing. The flowchart illustrated in FIG. 7 is processing repeatedly performed in a predetermined cycle by the supervisory control unit 40.

At step S10, the first input voltage VH1, the first output voltage VL1r, and the first current IH1 are acquired. In the present embodiment, each of the detection values VH1, VL1r, IH1 acquired by the first sub control unit 30a is output to the supervisory control unit 40, and therefore, can be acquired. Step S10 is equivalent to a first output current acquisition unit.

At step S11, the second input voltage VH2, the second output voltage VL2r, and the second current IH2 are acquired. In the present embodiment, each of the detection values VH2, VL2r, IH2 acquired by the second sub control unit 30b is output to the supervisory control unit 40, and therefore, can be acquired. Step S11 is equivalent to a second output current acquisition unit. At step S12, an output current Io as a load output to the first storage battery 60 is estimated. The output current Io is the total of current output from each of the first DDC 10a and the second DDC 10b to the first storage battery 60. In the present embodiment, the output current Io is estimated based on each detection value acquired at steps S10, S11 and the turn ratio between the primary-side coil L1 and the secondary-side coil L2.

At steps S13, S15, it is determined whether the output current Io estimated at step S12 is a value in the first load area LA1 or a value in the second load area LA2. First, at step S13, it is determined whether the output current Io estimated at step S12 is equal to or lower than the first current threshold Th1 or not. The first current threshold Th1 is a value for drawing a line between the first load area LA1 and the second load area LA2.

Note that the first current threshold Th1 may be a value obtained in such a manner that a predetermined margin is added to the rated current of the second DDC 10b. In this case, the first current threshold Th1 is preferably a value greater than such an output current that the power conversion efficiency of the first DDC 10a illustrated in FIG. 3 is maximum.

At step S13, in a case where it is determined that the output current Io is equal to or lower than the first current threshold Th1, it is determined that the output current Io is included in the first load area LA1, and the processing proceeds to step S14. At step S14, only the second DDC 10b is independently operated. The supervisory control unit 40 sets the first voltage command value VL1* to a value smaller than the second voltage command value VL2* such that only the second DDC 10b is independently operated.

Figure 8:
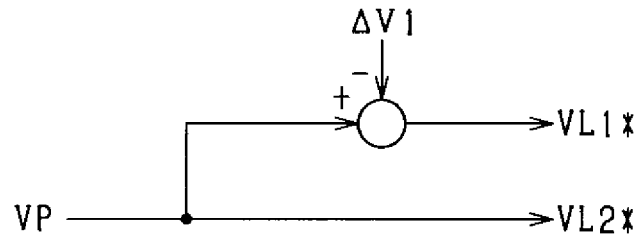
FIG. 8 is a diagram for describing control of the supervisory control unit in the case of independently operating the second DDC.

FIG. 8 is a diagram for describing the processing of setting each of the voltage command values VL1*, VL2* by the supervisory control unit 40 to independently operate the second DDC 10b. The same supervisory voltage command value VP is employed for the first DDC 10a and the second DDC 10b, and for example, is set to a voltage (e.g., 14 V) corresponding to the rated voltage of the first storage battery 60. The supervisory voltage command value VP is, for example, output from a not-shown ECU connected to the supervisory control unit 40.

The supervisory control unit 40 sets a value obtained by subtraction of a first predetermined value ΔV1 (e.g., 0.5 V) from the supervisory voltage command value VP as the first voltage command value VL1* (e.g., 13.5 V) of the first DDC 10a. On the other hand, the supervisory control unit 40 directly sets the supervisory voltage command value VP as the second voltage command value VL2* of the second DDC 10b. The constant voltage control unit 31b of the second sub control unit 30b calculates the second target current value Irefcv2 based on the set second voltage command value VL2* such that the second output voltage VL2r is controlled to the second voltage command value VL2*.

Meanwhile, the constant voltage control unit 31a of the first sub control unit 30a calculates the first target current value Irefcv1 based on the set first voltage command value VL1*. The first voltage command value VL1* is a value smaller than the first output voltage VL1r detected by the first output voltage sensor 22a, and therefore, in the previously-described voltage deviation calculator 312 of FIGS. 2A and 2B, the deviation between the first output voltage VL1r and the first voltage command value VL1* is a negative value. Thus, the first target current value Irefcv1 output from the constant voltage control unit 31a is such a value that the negative deviation is subjected to the proportional integration in the PI controller 313. The first target current value Irefcv1 is selected by the minimum value selection unit 33a, and as the first current command value Iref1, is output to the current determination unit 35a. The current determination unit 35a determines that the input first current command value Iref1 is equal to or smaller than the predetermined current value. As a result, the output determination unit 36a switches all of the drive signals G1 to G4 output from the duty control unit 348 to the OFF drive signals, and outputs the OFF drive signals. Accordingly, operation of the first DDC 10a is stopped, and only the second DDC 10b is independently operated.

Returning to description of FIG. 7 above, in a case where it is, at step S13, determined that the output current Io exceeds the first current threshold Th11, the processing proceeds to step S15, and it is determined whether the output current Io is equal to or lower than the second current threshold Th12 or not.

The second current threshold Th12 is a value for drawing a line between the second load area LA2 and the third load area LA3.

Note that the second current threshold Th12 may be set in such a manner that a predetermined margin is added to the rated current of the first DDC 10a. In this case, the second current threshold Th12 is preferably a value greater than such an output current that the power conversion efficiency of the first DDC 10a illustrated in FIG. 3 is maximum.

In a case where it is, at step S15, determined that the output current Io is equal to or lower than the second current threshold Th12, it is determined that the output current is included in the second load area LA2, and the processing proceeds to step S16. At step S16, the first DDC 10a is independently operated. Specifically, the supervisory control unit 40 sets the second voltage command value VL2* to a value smaller than the first voltage command value VL1* such that the first DDC 10a is independently operated.

Figure 9:
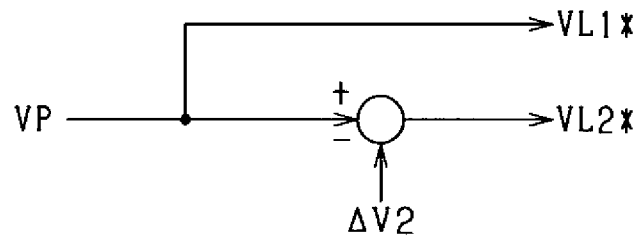
FIG. 9 is a diagram for describing the control of the supervisory control unit in the case of independently operating the first DDC.

FIG. 9 is a diagram for describing the processing of setting each of the voltage command values VL1*, VL2* by the supervisory control unit 40 to independently operate the second DDC 10b. In FIG. 9, the supervisory voltage command value VP is also set to a voltage corresponding to the rated voltage of the first storage battery 60, for example.

The supervisory control unit 40 sets a value obtained by subtraction of a second predetermined value ΔV2 (e.g., 0.5 V) from the supervisory voltage command value VP as the second voltage command value VL2* (e.g., 13.5 V) of the second DDC 10a. On the other hand, the supervisory control unit 40 directly sets the supervisory voltage command value VP as the first voltage command value VL1* of the first DDC 10b. The constant voltage control unit 31a of the first DDC 10a calculates the first target current value Irefcv1 based on the set first voltage command value VL1* such that the first output voltage VL1r is controlled to the first voltage command value VL1*.

Meanwhile, the constant voltage control unit 31b of the second DDC 10b calculates the second target current value Irefcv2 based on the set second voltage command value VL2*. The second voltage command value VL2* is a value smaller than the detected second output voltage VL2r, and therefore, in the previously-described voltage deviation calculator 312 of FIGS. 2A and 2B, the deviation between the second output voltage VL2r and the second voltage command value VL2* is a negative value. Thus, the second target current value Irefcv2 output from the constant voltage control unit 31b is such a value that the negative deviation is subjected to the proportional integration in the PI controller 313. The second target current value Irefcv2 is selected by the minimum value selection unit 33b, and as the second current command value Iref2, is output to the current determination unit 35b. The current determination unit 35b determines that the input second current command value Iref2 is equal to or smaller than the predetermined current value. As a result, the output determination unit 36b switches all of the drive signals G1 to G4 output from the duty control unit 348 to the OFF drive signals, and outputs the OFF drive signals. Accordingly, operation of the second DDC 10a is stopped, and only the first DDC 10b is independently operated.

Returning to description of FIG. 7 above, in a case where it is, at step S15, determined that the output current Io exceeds the second current threshold Th12, the processing proceeds to step S17, and it is determined whether the output current Io is equal to or lower than the third current threshold Th13 or not. Since the output current Io is equal to or lower than the third current threshold Th13, the output current of the second DDC 10b can be equal to or lower than the rated current in the case of performing the equalization control. Thus, in a case where it is, at step S17, determined that the output current Io is equal to or lower than the third current threshold Th13, the processing proceeds to step S18 to perform the equalization control.

Figure 10:
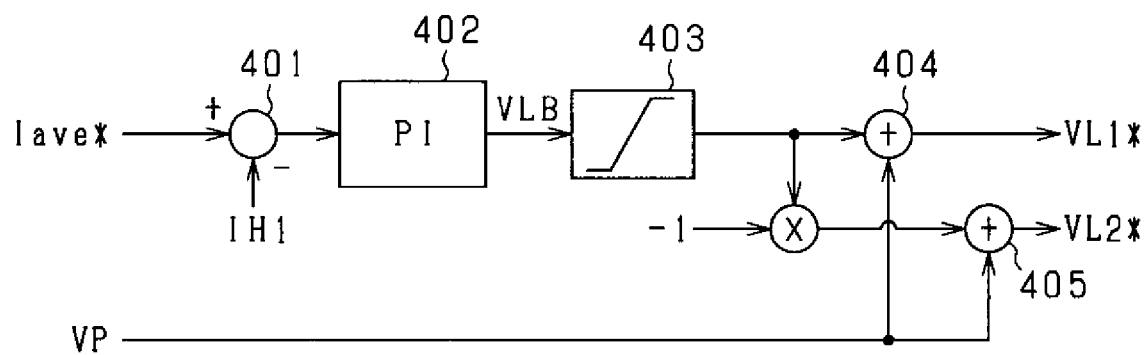
FIG. 10 is a diagram for describing the control of the supervisory control unit in the case of performing equalization control.

FIG. 10 is a diagram for describing the control of the supervisory control unit 40 in the case of performing the equalization control. In FIG. 10, the supervisory voltage command value VP is also set to, e.g., a voltage corresponding to the rated voltage of the first storage battery 60. The supervisory control unit 40 calculates the output correction voltage VLB as an operation amount for the control of feeding back an average current value of the first current IH1 and the second current IH2 to the first current IH1. Thus, step S18 is equivalent to an equalization control unit.

A current deviation calculator 401 subtracts the first current IH1 from an output current average Iave*, thereby calculating a deviation. The output current average Iave* is the average of the first current IH1 detected by the first current sensor 23a and the second current IH2 detected by the second current sensor 23b. A PI controller 402 calculates the output correction voltage VLB by the proportional-integral control based on the deviation calculated by the current deviation calculator 401. A slow changer 403 performs slow change processing for the output correction voltage VLB calculated by the PI controller 402, and outputs the resultant voltage. A first adder 404 sets, as the first voltage command value VL1*, the sum of the output correction voltage VLB subjected to the slow change processing and the supervisory voltage command value VP. A second adder 405 sets, as the second voltage command value VL2*, the sum of a sign-inverted value of the output correction voltage VLB subjected to the slow change processing and the supervisory voltage command value VP.

The current deviation calculator 401 may calculate a deviation between an output current Io1 calculated from the first current IH1 according to the turn ratio of the first DDC 10a to the transformer 13 and the output current average Iave*. In this case, the output current average Iave* is the average of an output current Io2 calculated from the second current IH2 according to the turn ratio of the second DDC 10b to the transformer 13 and the output current Io1.

Figure 11:
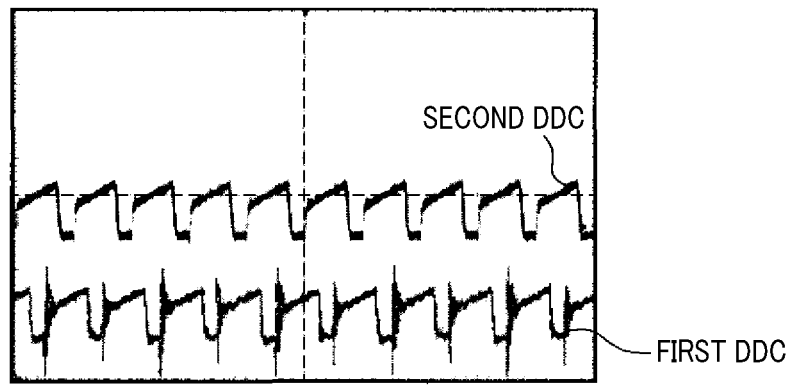
FIG. 11 is an output current waveform diagram in the case of operating the first and second DDCs together.

According to the processing illustrated in FIG. 10, the first voltage command value VL1* and the second voltage command value VL2* are set to values for equalizing the output current. Thus, as illustrated in FIG. 11, the output current of the first DDC 10a and the output current of the second DDC 10b are equalized and output.

Returning to description of FIG. 7, determination on the abnormal disconnection is made at step S19. In the present embodiment, it is, using the output correction voltage VLB calculated at step S18, determined whether the abnormal disconnection has been caused at any of the first DDC 10a and the second DDC 10b or not. Step S19 is equivalent to an abnormal disconnection determination unit.

Figure 12:
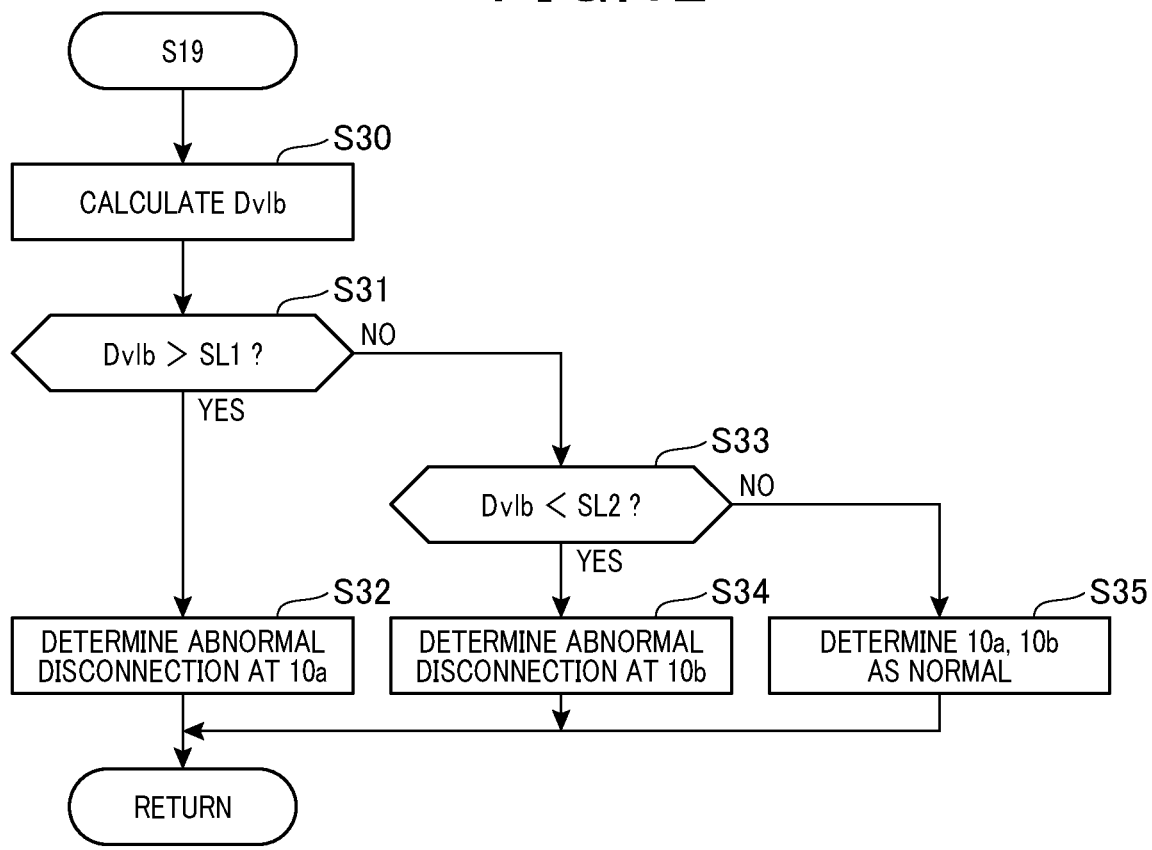
FIG. 12 is a flowchart for describing detailed processing of step S19 of FIG. 7.

Next, detailed processing of step S19 of FIG. 7 will be described with reference to a flowchart of FIG. 12.

At step S30, the gradient value Dvlb of the output correction voltage VLB with respect to the output current is calculated. In the present embodiment, the gradient value Dvlb is calculated using a derivative value of the output correction voltage VLB in association with a change in the first current IH1. Step S20 is equivalent to a gradient value calculation unit. The gradient value Dvlb is calculated using Expression (8) below.

$$\mathrm{Dvlb}=\Delta VLB/\Delta i \quad (8)$$

In this expression, $\Delta i$ indicates the amount of change in the first current IH1. $\Delta VLB$ indicates the amount of change in the output correction voltage VLB corresponding to the amount of change in the first current IH1.

Note that while the equalization control is being performed, the supervisory control unit 40 acquires the output correction voltage VLB and the first current IH1 used for calculation of the output correction voltage VLB multiple times, and from these values, calculates multiple derivative values "$\Delta VLB/\Delta i$." Then, the average of the calculated multiple derivative values "$\Delta VLB/\Delta i$" may be calculated as the gradient value Dvlb. Alternatively, under the condition that the amount $\Delta i$ of change in the first current IH1 is equal to or greater than a predetermined change (mainly equal to or greater than zero), the processing of calculating the gradient value Dvlb at S30 may be performed.

At step S31, the gradient value Dvlb calculated at step S30 is compared with the first gradient threshold SL1. The first gradient threshold SL1 is a gradient value of the upper limit value SH1 of the normal range as illustrated in FIG. 6. At step S31, in a case where it is determined that the gradient value Dvlb is greater than the first gradient threshold SL1, the processing proceeds to step S32. At step S32, it is determined that the abnormal disconnection has been caused at the first DDC 10a. Thus, the abnormal disconnection at the first DDC 10a can be identified among the abnormal disconnection at the first DDC 10a and the abnormal disconnection at the second DDC 10b.

In a case where it is, at step S31, determined that the gradient value Dvlb is equal to or smaller than the first gradient threshold SL1, the processing proceeds to step S33. At step S33, the gradient value Dvlb is compared with the second gradient threshold SL2. The second gradient threshold SL2 is a gradient value of the lower limit value LH2 of the normal range as illustrated in FIG. 6. At step S33, in a case where it is determined that the gradient value Dvlb is smaller than the second gradient threshold SL2, the processing proceeds to step S34. At step S34, it is determined that the abnormal disconnection has been caused at the second DDC 10b. Thus, the abnormal disconnection at the second DDC 10b can be identified among the abnormal disconnection at the first DDC 10a and the abnormal disconnection at the second DDC 10b.

At step S33, in a case where it is determined that the gradient value Dvlb is equal to or greater than the second gradient threshold SL2, the processing proceeds to step S35. At step S35, it is determined that neither the abnormal disconnection at the first DDC 10a nor the abnormal disconnection at the second DDC 10b has been caused. That is, it is determined that both of the output side of the first DDC 10a and the output side of the second DDC 10b are normal.

Returning to description of FIG. 7, in a case where it is, at step S17, determined that the output current Io exceeds the third current threshold Th13, the processing proceeds to step S20. At step S20, cooperative operation of the first DDC 10a and the second DDC 10b is performed. In the present embodiment, the second DDC 10b is, as cooperative operation, operated such that the output current reaches the rated current, and the first DDC 10a is operated with the output voltage corresponding to the first voltage command value VL1*.

In a case where the processing of any of steps S14, S16, S19, S20 ends, the processing of FIG. 7 temporarily ends.

With the above-described configuration, the power conversion system 10 according to the present embodiment exhibits the following advantageous effects.

Figure 13:
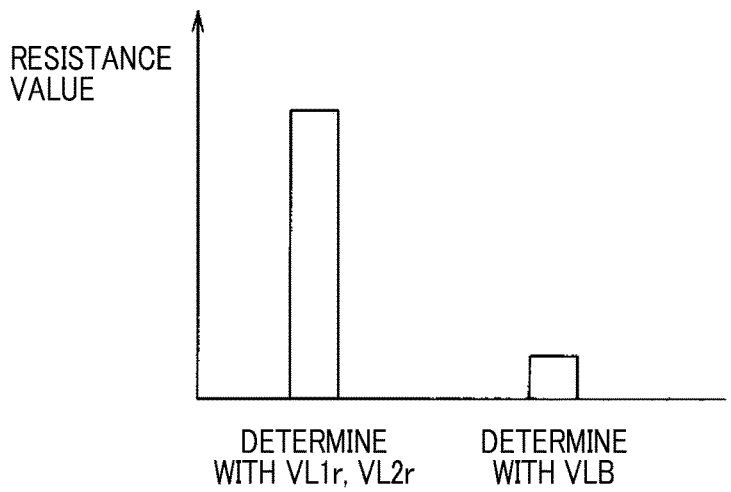
FIG. 13 describes a difference between determination on abnormal disconnection by means of an output voltage and determination on abnormal disconnection according to the present embodiment.

FIG. 13 describes a difference between determination on the abnormal disconnection by means of the output voltages VL1r, VL2r and determination on the abnormal disconnection according to the present embodiment. In FIG. 13, the vertical axis indicates the resistance value of each of the output side lines OUT1, OUT3 necessary for determination on the abnormal disconnection.

In a case where the abnormal disconnection is determined using the output voltages VL1r, VL2r generated at the output side lines OUT1, OUT3 of the first DDC 10a and the second DDC 10b, a voltage difference in the output voltages VL1r, VL2r between the case of the absence of the abnormal disconnection and the case of the presence of the abnormal disconnection needs to be set to equal to or greater than a predetermined value considering detection errors of the output voltages VL1r, VL2r. Thus, the resistance values R1, R2 of the output side lines OUT1, OUT3 of the first DDC 10a and the second DDC 10b need, for example, to be set to greater values (e.g., 100 mΩ). As a result, there is a problem that an energy loss caused in the output side lines OUT1, OUT3 becomes greater.

In the present embodiment, the output correction voltage VLB is used for determination on the abnormal disconnection, and the resistance values R1, R2 of the output side lines OUT1, OUT3 does not need to be set greater. Thus, the energy loss caused in the output side lines OUT1, OUT3 can be reduced. Moreover, the abnormal disconnection at the output side line OUT1, OUT3 is determined using the output correction voltage VLB, and therefore, the output side line OUT1, OUT3 at which the abnormal disconnection has been caused can be properly determined as compared to the case of using the output voltages VL1r, VL2r. That is, the abnormality of each of the resistance values R1, R2 on the output side can be detected with high accuracy.

The supervisory control unit 40 calculates the gradient value Dvlb of the output correction voltage VLB with respect to the first current IH1, and based on the calculated gradient value Dvlb, determines on which one of the output side (LO1, LO2, OUT1, OUT2) of the first DDC 10a or the output side (LO3, LO4, OUT3, OUT4) of the second DDC 10b the abnormal disconnection has been caused. The gradient value Dvlb does not basically have dependency on the value of the output current in determination on the abnormal disconnection. Thus, regardless of the value of the output current, it can be determined on which one of the output sides the abnormal disconnection has been caused.

The supervisory control unit 40 identifies, by comparison among the gradient thresholds SL1, SL2 indicating the gradient values in a state in which no abnormal disconnection has been caused on the output side and the calculated gradient value Dvlb, any of the abnormal disconnection on the output side of the first DDC 10a and the abnormal disconnection on the output side of the second DDC 10b. With the above-described configuration, the abnormal disconnection on the output side of any of the first DDC 10a and the second DDC 10b can be identified by the simple technique of comparing the gradient value Dvlb and each of the gradient thresholds SL1, SL2.

The supervisory control unit 40 calculates the output correction voltage VLB as the operation amount for the control of feeding back the output current average Iave* as the average of the first current IH1 and the second current IH2 to the first current IH1 or the second current IH2. With the above-described configuration, the output correction voltage VLB for equalizing the output currents of the first DDC 10a and the second DDC 10b can be accurately calculated.

Second Embodiment

In a second embodiment, configurations different from those of the first embodiment will be mainly described.

In a case where abnormal disconnection has been caused at both of a first DDC 10a and a second DDC 10b, both of resistance values R1, R2 on output sides are great values, and therefore, in some cases, a difference between the first resistance value R1 and the second resistance value R2 might become smaller in Expression (7) above and an output correction voltage VLB might become a small value. In this case, a change in the output correction voltage VLB less occurs. Moreover, in some cases, a gradient value Dvlb might be a value smaller than a first gradient threshold SL1 and greater than a second gradient threshold SL2. For this reason, in a case where the abnormal disconnection has been caused at both of the first DDC 10a and the second DDC 10b, such abnormal disconnection cannot be determined by the output correction voltage VLB in some cases.

Meanwhile, in a case where the abnormal disconnection has been caused at both of the first DDC 10a and the second DDC 10b, a battery correction voltage VLs is an abnormal value. Thus, in the second embodiment, not only a change in the output correction voltage VLB but also the battery correction voltage VLs are used to determine that the abnormal disconnection has been caused on both of the output sides of the first DDC 10a and the second DDC 10b.

Figure 14:
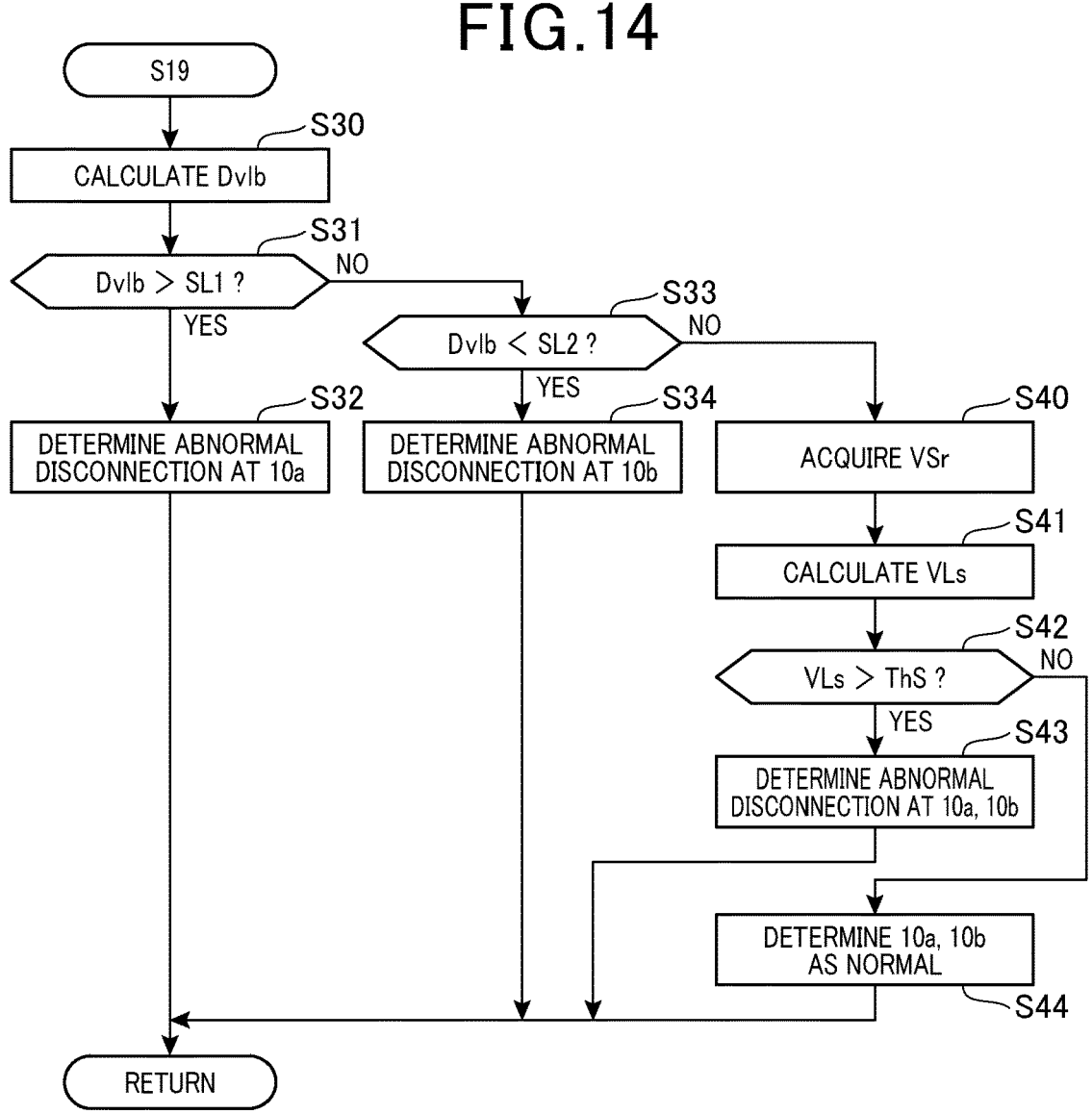
FIG. 14 is a flowchart for describing determination on abnormal disconnection in a second embodiment.

FIG. 14 is a flowchart for describing determination on the abnormal disconnection in the second embodiment. The flowchart of FIG. 14 is performed at step S19 of FIG. 7. Note that each type of processing of steps S30 to S34 is similar to that in determination on the abnormal disconnection as illustrated in FIG. 12, and therefore, description thereof will be omitted as necessary.

When it is determined that the gradient value Dvlb is equal to or greater than the second gradient threshold SL2 (step S33: NO), an inter-terminal voltage VSr detected by a battery voltage detection unit 24 is acquired at step S40. Step S40 is equivalent to an inter-terminal voltage acquisition unit.

Figure 15:
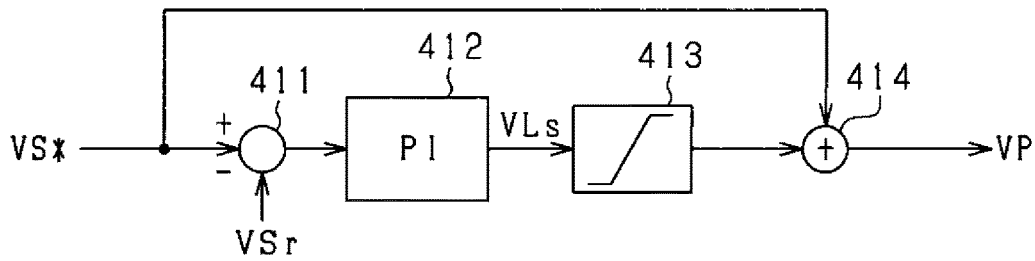
FIG. 15 is a diagram for describing a function of a supervisory control unit for setting a supervisory voltage command value VP based on a battery voltage command value VS* for setting an inter-terminal voltage of a first storage battery.

At step S41, the battery correction voltage VLs is calculated. FIG. 15 is a diagram for describing the function of a supervisory control unit 40 for setting a supervisory voltage command value VP based on a battery voltage command value VS* for setting the inter-terminal voltage VSr of a first storage battery 60. The supervisory control unit 40 calculates the supervisory voltage command value VP as an operation amount for the control of feeding back the inter-terminal voltage VSr to the battery voltage command value VS*. Step S41 is equivalent to a battery correction voltage calculation unit.

A voltage deviation calculator 411 subtracts the inter-terminal voltage VSr from the battery voltage command value VS* to calculate a deviation. A PI controller 412 calculates the battery correction voltage VLs by proportional-integral control based on the deviation calculated by the voltage deviation calculator 411. A slow changer 413 performs slow change processing for the battery correction voltage VLs calculated by the PI controller 412, and output the resultant voltage. An adder 414 sets, as the supervisory voltage command value VP, the sum of the battery correction voltage VLs subjected to the slow change processing and the battery voltage command value VS*.

In the above-described configuration, in a case where the abnormal disconnection has been caused on both of the output sides of the first DDC 10a and the second DDC 10b, output current supplied from each of the DDCs 10a, 10b to a first storage battery 60 is a low value, and a change in the inter-terminal voltage VSr applied to the voltage deviation calculator 411 is small. Thus, the deviation between the inter-terminal voltage VSr and the battery voltage command value VS* becomes greater. Then, the PI controller 412 performs the proportional integration for the deviation to calculate the battery correction voltage VLs, and therefore, the battery correction voltage shows an abnormal value showing a high value.

At step S42, the battery correction voltage VLs and a correction threshold ThS are compared with each other. For example, the correction threshold ThS may be set to an upper limit value of the battery correction voltage VLs in a case where no abnormal disconnection has been caused at the first DDC 10a and the second DDC 10b.

At step S42, in a case where it is determined that the battery correction voltage VLs is higher than the correction threshold ThS, the processing proceeds to step S43. At step S43, it is determined that the abnormal disconnection has been caused at both of the first DDC 10a and the second DDC 10b. In this case, the supervisory control unit 40 may output, for example, a signal for stopping operation of a power conversion system 10 to a supervisory ECU.

At step S42, in a case where it is determined that the battery correction voltage VLs is equal to or lower than the correction threshold ThS, the processing proceeds to step S44. At step S44, it is determined that both of the output side of the first DDC 10a and the output side of the second DDC 10b are normal.

In a case where the processing of any of steps S32, S34, S43, S44 ends, the processing returns to the flowchart of FIG. 7.

With the above-described configuration, the power conversion system 10 according to the present embodiment exhibits the following advantageous effects.

Even in a case where the abnormal disconnection cannot be determined by the output correction voltage VLB, if the battery correction voltage VLs shows an abnormality, there is a high probability that the abnormal disconnection has been caused on both of the output side of the first DDC 10a and the output side of the second DDC 10b. In the above-described configuration, in a case where the abnormal disconnection on the output sides of the first DDC 10a and the second DDC 10b is not determined based on the output correction voltage VLB and it is determined that the battery correction voltage VLs is higher than the correction threshold ThS, the supervisory control unit 40 determines that the abnormal disconnection has been caused on both of the output side of the first DDC 10a and the output side of the second DDC 10b. Thus, a state in which the abnormal disconnection has been caused on both of the output side of the first DDC 10a and the output side of the second DDC 10b can be determined, and reliability in the abnormal disconnection can be enhanced.

Third Embodiment

In a third embodiment, configurations different from those of the second embodiment will be mainly described.

When an internal abnormality has been caused at any of a first DDC 10a and a second DDC 10b, output voltages VL1r, VL2r might be abnormal values in some cases. Due to the abnormal values of the output voltages VL1r, VL2r, there is a probability that a change in an output correction voltage VLB becomes greater and an supervisory control unit 40 determines such a change in the output correction voltage VLB as abnormal disconnection on an output side of the first DDC 10a and an output side of the second DDC 10b. For this reason, in the third embodiment, the supervisory control unit 40 determines the internal abnormality of the first DDC 10a and the second DDC 10b, and under the condition that no internal abnormality has been caused in the first DDC 10a and the second DDC 10b, determines the abnormal disconnection at the first DDC 10a and the second DDC 10b.

Figure 16:
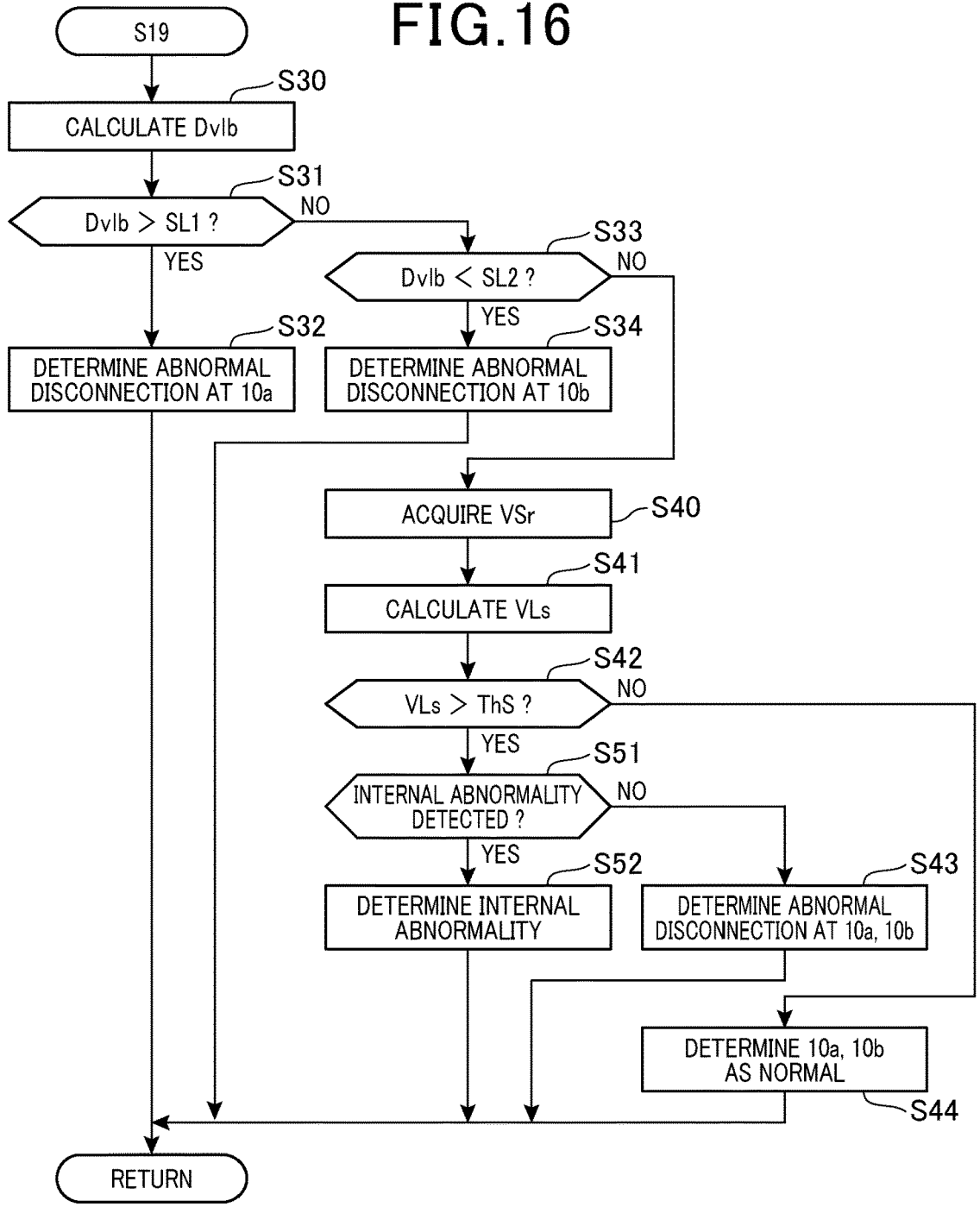
FIG. 16 is a flowchart for describing processing performed by a supervisory control unit according to a third embodiment.

FIG. 16 is a flowchart for describing processing performed by the supervisory control unit 40 in the third embodiment. The flowchart of FIG. 16 is processing performed by the supervisory control unit 40 at step S19 of FIG. 7. Note that steps S30 to S34 and steps S40 to S44 are similar to the processing illustrated in FIG. 14, and therefore, description thereof will be omitted as necessary.

At step S42, a battery correction voltage VLs is compared with a correction threshold ThS. At step S42, in a case where it is determined that the battery correction voltage VLs is equal to or lower than the correction threshold ThS, the processing proceeds to step S44. At step S44, it is determined that both of the first DDC 10a and the second DDC 10b are normal, and the processing of FIG. 16 ends.

On the other hand, at step S42, in a case where the battery correction voltage VLs is determined as a greater value than the correction threshold ThS, the processing proceeds to step S51. At step S51, it is detected whether the internal abnormality of the first DDC 10a and the second DDC 10b has been caused or not. For example, the internal abnormality includes an abnormality that each of switches Q1 to Q4 is fixed to an ON state or an OFF state. The technique of detecting the internal abnormality includes, for example, the technique of detecting failure of each of the switches Q1 to Q4 based on a first current IH1 and a second current IH2 detected by each of current sensors 23a, 23b. Specifically, in a case where failure has been caused at any of the switches Q1 to Q6, a value of each of the currents IH1, IH2 changes, and shows an abnormal value. Thus, the supervisory control unit 40 detects that the internal abnormality has been caused in the first DDC 10a or the second DDC 10b in a case where each of the currents IH1, IH2 falls outside a range indicating a normal value of the current value.

At step S51, in a case where the internal abnormality of at least one of the first DDC 10a or the second DDC 10b has been detected, the processing proceeds to step S52. At step S52, it is determined that the internal abnormality has been caused in at least one of the first DDC 10a or the second DDC 10b. In this case, the internal abnormality may be notified to a supervisory ECU 20, for example. Steps S51, 52 are equivalent to an internal abnormality determination unit.

At step S51, in a case where no internal abnormality of at least one of the first DDC 10a or the second DDC 10b has been detected, the processing proceeds to step S43. In a case where the processing proceeds to step S43, it is determined that the battery correction voltage VLs is a greater value than the correction threshold ThS (step S42: YES), and no internal abnormality has been determined (step S51: NO). Thus, at step S43, it is determined that the abnormal disconnection has been caused on both of the output side of the first DDC 10a and the output side of the second DDC 10b.

In a case where the processing of any of steps S32, S34, S52, S43, S44 ends, the processing returns to the flowchart of FIG. 7.

With the above-described configuration, a power conversion system 10 according to the present embodiment exhibits the following advantageous effects.

In a case where the internal abnormality has been caused in the first DDC 10a and the second DDC 10b, it is difficult to determine whether the internal abnormality is due to a change in a gradient value of the output correction voltage VLB or due to the abnormal disconnection at output side line OUT1, OUT2. On this point, in the above-described configuration, the supervisory control unit 40 determines the internal abnormality of the first DDC 10a and the second DDC 10b. Under the condition that no internal abnormality of the first DDC 10a and the second DDC 10b has been determined, the abnormal disconnection on the output side of the first DDC 10a and the output side of the second DDC 10b is determined. Thus, determination on whether the abnormality of the output correction voltage VLB is due to the internal abnormality of the first DDC 10a or the second DDC 10b or due to the abnormal disconnection on each output side can be made, and therefore, the accuracy of determination on the abnormal disconnection can be enhanced.

Fourth Embodiment

In a fourth embodiment, configurations different from those of the first embodiment will be mainly described.

In the fourth embodiment, in a case where start-up of a power conversion system 10 has been determined, a supervisory control unit 40 forcibly determines equalization control and determination on abnormal disconnection in association with the equalization control.

Figure 17:
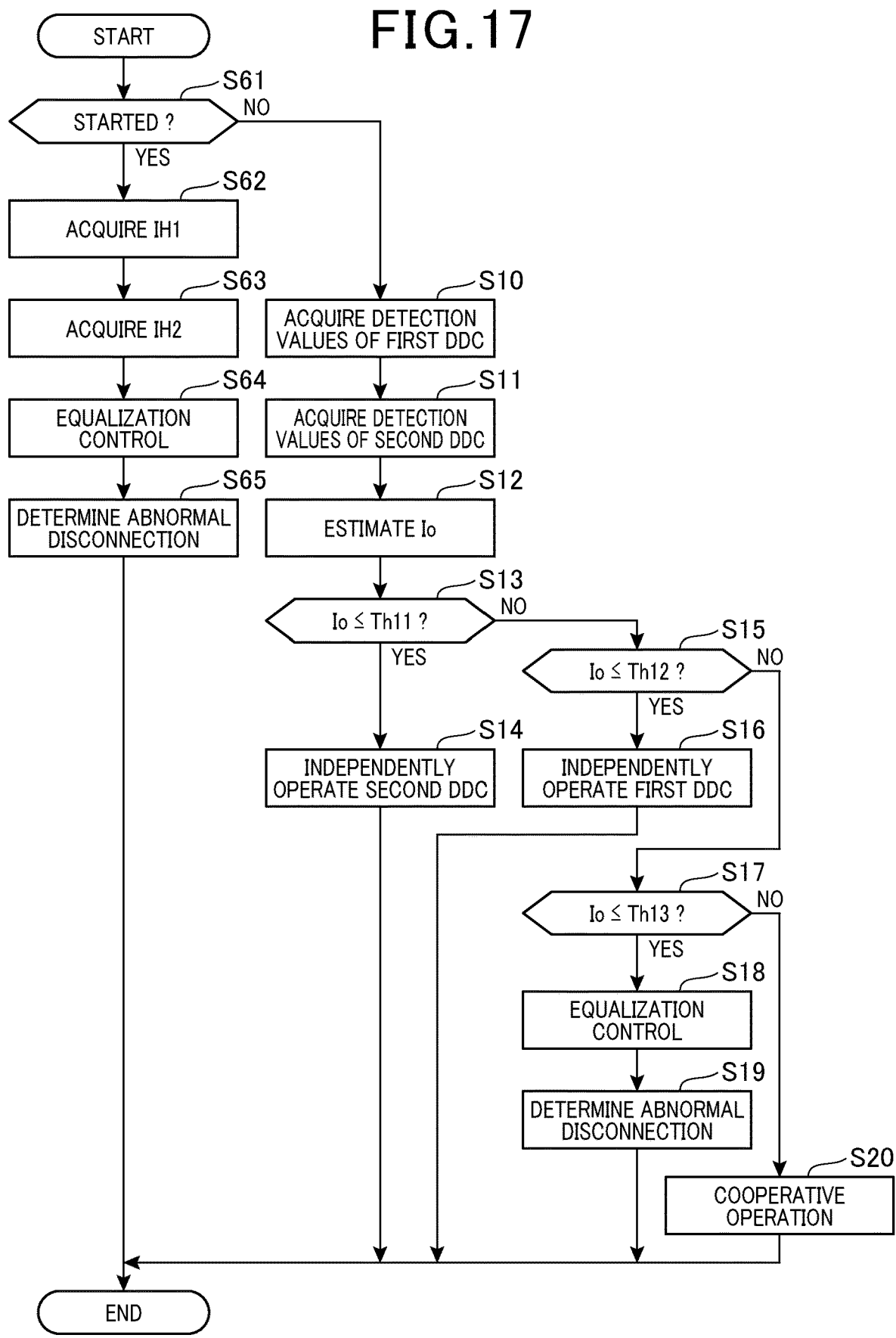
FIG. 17 is a flowchart for describing processing performed by a supervisory control unit according to a fourth embodiment.

FIG. 17 is a flowchart for describing processing performed by the supervisory control unit 40 in the fourth embodiment. The supervisory control unit 40 repeatedly performs the processing illustrated in FIG. 17. In FIG. 17, each type of processing illustrated at steps S10 to S20 is similar to each type of processing illustrated in FIG. 7, and therefore, description thereof will be omitted as necessary.

At step S61, the presence or absence of the start-up of the power conversion system 10 is determined. For example, it is assumed that an ignition of a vehicle equipped with the power conversion system 10 is turned on to input a start-up signal for starting the power conversion system 10 from a not-shown ECU to the supervisory control unit 40. In this case, it is determined that the power conversion system 10 has been started. Step S61 is equivalent to a start-up determination unit.

At step S61, in a case where the start-up of the power conversion system 10 has been determined, the processing proceeds to step S62. At step S62, a first current IH1 is acquired. At step S63, a second current IH2 is acquired. At step S64, the equalization control is performed for a first DDC 10a and a second DDC 10b. The equalization control performed at step S64 is processing similar to that of step S18 of FIG. 7. At step S65, the abnormal disconnection is determined using a gradient value Dvlb of an output correction voltage VLB. Determination on the abnormal disconnection at step S65 is processing similar to that of step S19 of FIG. 7.

On the other hand, at step S61, in a case where a start-up state of the power conversion system 10 is not determined, the processing proceeds to step S10. At steps S10 to S20, operation of the first DDC 10a and the second DDC 10b are switched according to an estimated output current Io. Then, in the case of performing the equalization control (step S18), the abnormal disconnection is, at step S19, determined based on the output correction voltage VLB while the equalization control is being performed.

With the above-described configuration, the power conversion system 10 according to the present embodiment exhibits the following advantageous effects.

The supervisory control unit 40 forcibly performs the equalization control upon the start-up of the power conversion system 10, and while the equalization control is being performed, the abnormal disconnection on an output side of the first DDC 10a and an output side of the second DDC 10b is determined. Thus, the opportunity of determining the presence or absence of the abnormal disconnection can be properly ensured.

Other Embodiments

Figure 18:
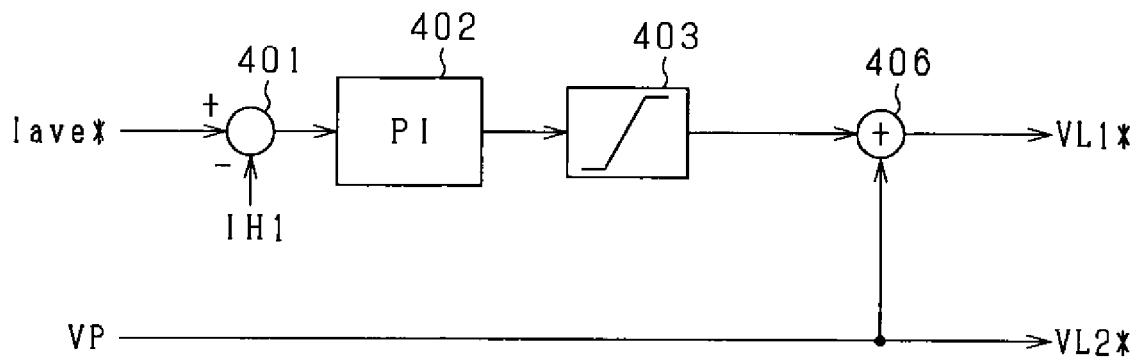
FIG. 18 is a diagram of another example of the equalization control.
Figure 19:
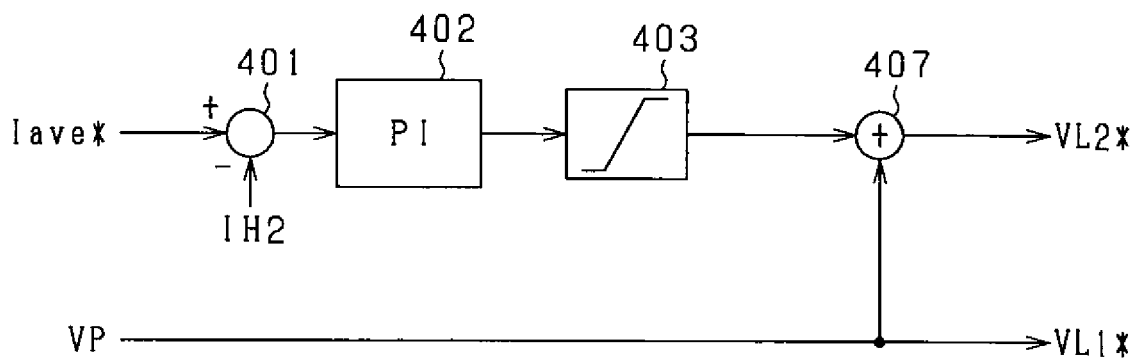
FIG. 19 is a diagram of still another example of the equalization control.
Figure 20:
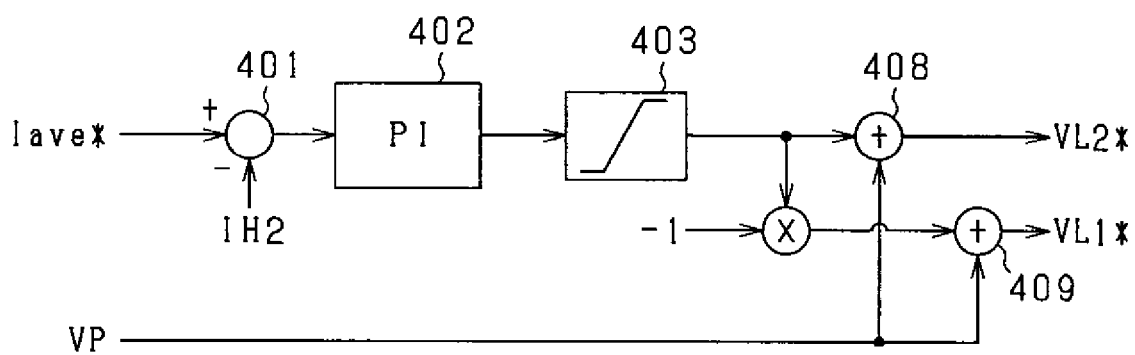
FIG. 20 is a diagram of still another example of the equalization control.

The supervisory control unit 40 may have the following configuration as the configuration when the equalization control is performed. FIGS. 18 to 20 are diagrams of other examples of the equalization control.

In FIGS. 18 and 19, only the supervisory voltage command value VP of any of the first DDC 10a and the second DDC 10b is corrected with the output correction voltage VLB. Specifically, in FIG. 18, an adder 406 of the supervisory control unit 40 set, as the first voltage command value VL1*, the sum of the output correction voltage VLB subjected to the slow change processing and the supervisory voltage command value VP. Moreover, the supervisory control unit 40 directly sets the supervisory voltage command value VP as the second voltage command value VL2*.

In FIG. 19, the current deviation calculator 401 subtracts the second current IH2 from the output current average Iave* to calculate the deviation. The PI controller 402 calculates the output correction voltage VLB by the proportional-integral control based on the deviation calculated by the current deviation calculator 401. An adder 407 of the supervisory control unit 40 sets, as the second voltage command value VL2*, the sum of the output correction voltage VLB subjected to the slow change processing and the supervisory voltage command value VP. On the other hand, the supervisory control unit 40 directly sets the supervisory voltage command value VP as the first voltage command value VL1*.

In FIG. 20, the current deviation calculator 401 subtracts the second current IH2 from the output current average Iave* to calculate the deviation. The PI controller 402 calculates the output correction voltage VLB by the proportional-integral control based on the deviation calculated by the current deviation calculator 401. A first adder 408 of the supervisory control unit 40 sets, as the second voltage command value VL2*, the sum of the output correction voltage VLB subjected to the slow change processing and the supervisory voltage command value VP. On the other hand, a second adder 409 sets, as the first voltage command value VL1*, the sum of the sign-inverted value of the output correction voltage VLB subjected to the slow change processing and the supervisory voltage command value VP.

Instead of setting the output current Io based on each of the currents IH1, IH2, the supervisory control unit 40 may directly detect the output currents Io of the first and second DDCs 10a, 10b. In this case, the first and second DDCs 10a, 10b each include current detection units configured to detect the amount of current output from the reactor 15, and the first and second sub control units 30a, 30b acquire detection results of the current detection units as the output currents and output these detection results to the supervisory control unit 40.

Instead of calculating the target current value based on the value obtained in such a manner that the proportional-integral control is performed for the deviation between the voltage command value VL* and the output voltage VLr, the constant voltage control unit 31a, 31b may calculate the target current value based on any of values obtained in such a manner that proportional control and integral control are performed for the deviation between the voltage command value VL* and the output voltage VLr.

Power output from each of the first DDC 10a and the second DDC 10b may be used as the load output estimated by the supervisory control unit 40. In this case, rated power is used as a rated output value instead of the rated current.

The control device is, as one example, divided into the supervisory control unit 40 and the sub control units 30a, 30b. Instead, it may be configured such that a single control unit includes each function of the supervisory control unit 40 and the sub control units 30a, 30b.

In FIG. 1, the second DDC 10b and the first storage battery 60 may be connected as follows. The second output side line OUT2 connected to the third terminal T3 of the second DDC 10b is connected to the plus-side terminal of the first storage battery 60, and the fourth output side line OUT4 connected to the fourth terminal T4 is connected to the minus-side terminal of the first storage battery 60. In this case, the abnormal disconnection on the output side of the first DDC 10a includes disconnection in the middle of at least one of the first electric path LO1, the second electric path LO2, the first output side line OUT1, or the second output side line OUT2. Moreover, the abnormal disconnection on the output side of the second DDC 10b includes disconnection in the middle of at least one of the third electric path LO3, the fourth electric path LO4, the third output side line OUT3, or the fourth output side line OUT4.

The supervisory control unit 40 may determine the abnormal disconnection at the first DDC 10a and the second DDC 10b by means of the output correction voltage VLB instead of the gradient value Dvlb of the output correction voltage VLB. In this case, the supervisory control unit 40 compares the output correction voltage VLB with the upper limit value LH1 and the lower limit value LH2 illustrated in FIG. 6, thereby determining the abnormal disconnection at the first DDC 10a and the second DDC 10b. Specifically, at step S31 of FIG. 12, in a case where it is determined that the output correction voltage VLB is higher than the upper limit value LH1, the abnormal disconnection on the output side of the first DDC 10a is determined. Moreover, at step S33 of FIG. 12, in a case where it is determined that the output correction voltage VLB is smaller than the lower limit value LH2, the abnormal disconnection on the output side of the second DDC 10b is determined. The upper limit value LH1 and the lower limit value LH2 used for determination on the abnormal disconnection may be set greater as the output current Io increases.

Based on the above exemplary described embodiments, following power conversion system control devices of the present disclosure are also provided:

(1) A power conversion system control device applied to a power conversion system including a first power conversion device and a second power conversion device connected in parallel with a common power supply target, comprising:

an equalization control unit configured to perform an equalization control of correcting, with an output correction voltage, at least any of a voltage command value of the first power conversion device and a voltage command value of the second power conversion device to equalize an output current; and an abnormal disconnection determination unit configured to determine, based on the output correction voltage, on which one of an output side of the first power conversion device or an output side of the second power conversion device abnormal disconnection has been caused while the equalization control is being performed.

(2) The power conversion system control device according to (1), further comprising:

a first output current acquisition unit configured to acquire a first output current supplied from the first power conversion device to the power supply target;

a second output current acquisition unit configured to acquire a second output current supplied from the second power conversion device to the power supply target; and a gradient value calculation unit configured to calculate a gradient value of the output correction voltage with respect to a change in the first output current or the second output current, wherein the abnormal disconnection determination unit determines, based on the calculated gradient value, on which one of the output side of the first power conversion device or the output side of the second power conversion device the abnormal disconnection has been caused.

(3) The power conversion system control device according to (2), wherein the abnormal disconnection determination unit compares the gradient value in a state in which no abnormal disconnection has been caused on the output side and the gradient value calculated by the gradient value calculation unit, thereby identifying whether the abnormal disconnection on the output side of the first power conversion device or the abnormal disconnection on the output side of the second power conversion device has been caused.

(4) The power conversion system control device according to any one of (1) to (3), further comprising:

the first output current acquisition unit configured to acquire the first output current supplied from the first power conversion device to the power supply target; and the second output current acquisition unit configured to acquire the second output current supplied from the second power conversion device to the power supply target, wherein the equalization control unit calculates the output correction voltage as an operation amount for a control of feeding back an average current value of the first output current and the second output current to the first output current or the second output current.

(5) The power conversion system control device according to any one of (1) to (4), further comprising:

an inter-terminal voltage acquisition unit configured to acquire an inter-terminal voltage of a storage battery, the power supply target being the storage battery; and a battery correction voltage calculation unit configured to calculate a battery correction voltage for correcting a battery voltage command value as an operation amount for a control of feeding back the inter-terminal voltage to the battery voltage command value, wherein in a case where it is not, based on the output correction voltage, determined that the abnormal disconnection has been caused on the output sides of the first power conversion device and the second power conversion device and it is determined that the battery correction voltage is an abnormal value, the abnormal disconnection determination unit determines that the abnormal disconnection has been caused on both of the output side of the first power conversion device and the output side of the second power conversion device.

(6) The power conversion system control device according to (5), further comprising:

an internal abnormality determination unit configured to determine an internal abnormality of the first power conversion device and the second power conversion device, wherein in a case where it is not determined that the abnormal disconnection has been caused on the output sides of the first power conversion device and the second power conversion device, it is determined that the battery correction voltage is the abnormal value, and the internal abnormality determination unit does not determine that the internal abnormality has been caused in both of the first power conversion device and the second power conversion device, the abnormal disconnection determination unit determines that the abnormal disconnection has been caused on both of the output side of the first power conversion device and the output side of the second power conversion device.

(7) The power conversion system control device according to any one of (1) to (6), further comprising:

a start-up determination unit configured to determine start-up of the power conversion system, wherein the equalization control unit performs the equalization control in a case where the start-up of the power conversion system is determined, and the abnormal disconnection determination unit determines, based on the output correction voltage, on which one of the output side of the first power conversion device or the output side of the second power conversion device the abnormal disconnection has been caused while the equalization control is being performed in a case where the start-up of the power conversion system is determined.

The present disclosure has been described in accordance with the embodiments, but it is understood that the present disclosure is not limited to these embodiments and structures. The present disclosure also includes various modifications and modifications in the scope of equivalents. In addition, not only various combinations and forms but also other combinations and forms including more, less, or a single element are also within the scope and sprit of the present disclosure.

What is claimed is:

1. A power conversion system control device applied to a power conversion system including a first power conversion device and a second power conversion device connected in parallel with a common power supply target, comprising:
   an equalization control unit configured to perform an equalization control of correcting, with an output correction voltage, at least any of a voltage command value of the first power conversion device and a voltage command value of the second power conversion device to equalize an output current;
   an abnormal disconnection determination unit configured to determine, based on the output correction voltage, on which one of an output side of the first power conversion device or an output side of the second power conversion device abnormal disconnection has been caused while the equalization control is being performed;
   a first output current acquisition unit configured to acquire a first output current supplied from the first power conversion device to the power supply target;
   a second output current acquisition unit configured to acquire a second output current supplied from the second power conversion device to the power supply target; and
   a gradient value calculation unit configured to calculate a gradient value of the output correction voltage with respect to a change in the first output current or the second output current,
   wherein the abnormal disconnection determination unit determines, based on the calculated gradient value, on which one of the output side of the first power conversion device or the output side of the second power conversion device the abnormal disconnection has been caused.

2. The power conversion system control device according to claim 1, wherein
   the abnormal disconnection determination unit compares the gradient value in a state in which no abnormal disconnection has been caused on the output side and the gradient value calculated by the gradient value calculation unit, thereby identifying whether the abnormal disconnection on the output side of the first power conversion device or the abnormal disconnection on the output side of the second power conversion device has been caused.

3. The power conversion system control device according to claim 1, wherein:
   the first output current acquisition unit is configured to acquire the first output current supplied from the first power conversion device to the power supply target;
   the second output current acquisition unit is configured to acquire the second output current supplied from the second power conversion device to the power supply target, and
   the equalization control unit calculates the output correction voltage as an operation amount for a control of feeding back an average current value of the first output current and the second output current to the first output current or the second output current.

4. The power conversion system control device according to claim 1, further comprising:
   an inter-terminal voltage acquisition unit configured to acquire an inter-terminal voltage of a storage battery, the power supply target being the storage battery; and
   a battery correction voltage calculation unit configured to calculate a battery correction voltage for correcting a battery voltage command value as an operation amount for a control of feeding back the inter-terminal voltage to the battery voltage command value,
   wherein in a case where it is not, based on the output correction voltage, determined that the abnormal disconnection has been caused on the output sides of the first power conversion device and the second power conversion device and it is determined that the battery correction voltage is an abnormal value, the abnormal disconnection determination unit determines that the abnormal disconnection has been caused on both of the output side of the first power conversion device and the output side of the second power conversion device.

5. The power conversion system control device according to claim 1, further comprising:
   a start-up determination unit configured to determine start-up of the power conversion system,
   wherein the equalization control unit performs the equalization control in a case where the start-up of the power conversion system is determined, and
   the abnormal disconnection determination unit determines, based on the output correction voltage, on which one of the output side of the first power conversion device or the output side of the second power conversion device the abnormal disconnection has been caused while the equalization control is being performed in a case where the start-up of the power conversion system is determined.

6. A power conversion system control device applied to a power conversion system including a first power conversion device and a second power conversion device connected in parallel with a common power supply target, comprising:
   an equalization control unit configured to perform an equalization control of correcting, with an output correction voltage, at least any of a voltage command value of the first power conversion device and a voltage command value of the second power conversion device to equalize an output current;
   an abnormal disconnection determination unit configured to determine, based on the output correction voltage, on which one of an output side of the first power conversion device or an output side of the second power conversion device abnormal disconnection has been caused while the equalization control is being performed;
   an inter-terminal voltage acquisition unit configured to acquire an inter-terminal voltage of a storage battery, the power supply target being the storage battery; and
   a battery correction voltage calculation unit configured to calculate a battery correction voltage for correcting a battery voltage command value as an operation amount for a control of feeding back the inter-terminal voltage to the battery voltage command value,
   wherein in a case where it is not, based on the output correction voltage, determined that the abnormal disconnection has been caused on the output sides of the first power conversion device and the second power conversion device and it is determined that the battery correction voltage is an abnormal value, the abnormal disconnection determination unit determines that the abnormal disconnection has been caused on both of the output side of the first power conversion device and the output side of the second power conversion device.

7. The power conversion system control device according to claim 6, further comprising:
an internal abnormality determination unit configured to determine an internal abnormality of the first power conversion device and the second power conversion device,
wherein in a case where it is not determined that the abnormal disconnection has been caused on the output sides of the first power conversion device and the second power conversion device, it is determined that the battery correction voltage is the abnormal value, and the internal abnormality determination unit does not determine that the internal abnormality has been caused in both of the first power conversion device and the second power conversion device, the abnormal disconnection determination unit determines that the abnormal disconnection has been caused on both of the output side of the first power conversion device and the output side of the second power conversion device.

* * * * *